US010936141B2

(12) United States Patent
Touyama et al.

(10) Patent No.: US 10,936,141 B2
(45) Date of Patent: Mar. 2, 2021

(54) INFORMATION PROCESSING DEVICE AND INFORMATION PROCESSING METHOD

(71) Applicant: SONY CORPORATION, Tokyo (JP)

(72) Inventors: Keisuke Touyama, Tokyo (JP); Kae Nagano, Tokyo (JP); Tomohiro Ishii, Tokyo (JP); Takatoshi Nakamura, Tokyo (JP); Toru Nagara, Tokyo (JP); Kozue Sasaki, Tokyo (JP); Kazuhiro Toma, Kanagawa (JP); Nobuaki Kawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 89 days.

(21) Appl. No.: 15/551,215

(22) PCT Filed: Jan. 13, 2016

(86) PCT No.: PCT/JP2016/050802
§ 371 (c)(1),
(2) Date: Aug. 15, 2017

(87) PCT Pub. No.: WO2016/136307
PCT Pub. Date: Sep. 1, 2016

(65) Prior Publication Data
US 2018/0032213 A1 Feb. 1, 2018

(30) Foreign Application Priority Data
Feb. 27, 2015 (JP) .............................. JP2015-039548

(51) Int. Cl.
*G06F 3/048* (2013.01)
*G06F 3/0481* (2013.01)
(Continued)

(52) U.S. Cl.
CPC .......... *G06F 3/0481* (2013.01); *G06F 3/0425* (2013.01); *G06F 3/0484* (2013.01);
(Continued)

(58) Field of Classification Search
CPC combination set(s) only.
See application file for complete search history.

(56) References Cited

U.S. PATENT DOCUMENTS

2005/0122313 A1* 6/2005 Ashby .................. G06F 3/0219
345/168
2010/0321324 A1* 12/2010 Fukai ...................... A61B 8/00
345/173
(Continued)

FOREIGN PATENT DOCUMENTS

JP          2010-79529 A      4/2010
JP          2010-079529 A     4/2010
(Continued)

OTHER PUBLICATIONS

International Search Report and Written Opinion of PCT Application No. PCT/JP2016/050802, dated Apr. 19, 2016, 01 pages of English Translation and 06 pages of ISRWO.

*Primary Examiner* — Di Xiao
(74) *Attorney, Agent, or Firm* — Chip Law Group

(57) ABSTRACT

Provided is an information processing device, including a display control unit that performs first display control for causing an operation image to be displayed on a display screen and second display control for causing a first display indicating a correspondence relation between the operation image and an operating unit to be displayed at a position related with the operating unit.

16 Claims, 24 Drawing Sheets

(51) Int. Cl.
*G06F 3/0484* (2013.01)
*G06F 3/0488* (2013.01)
*G06F 3/042* (2006.01)
*G06F 3/0487* (2013.01)

(52) U.S. Cl.
CPC ........ *G06F 3/0487* (2013.01); *G06F 3/04842* (2013.01); *G06F 3/04886* (2013.01); *G06F 3/04847* (2013.01)

(56) References Cited

U.S. PATENT DOCUMENTS

| | | | | |
|---|---|---|---|---|
| 2011/0246891 | A1* | 10/2011 | Schubert | G06F 9/452 715/719 |
| 2012/0208466 | A1* | 8/2012 | Park | H04N 21/4438 455/41.3 |
| 2013/0002535 | A1* | 1/2013 | Onishi | G01S 1/725 345/156 |
| 2015/0058764 | A1* | 2/2015 | Moran | G06F 3/0488 715/765 |
| 2015/0188766 | A1* | 7/2015 | Song | G06F 3/1446 709/205 |
| 2015/0227303 | A1* | 8/2015 | Sudo | H04N 5/23216 715/771 |

FOREIGN PATENT DOCUMENTS

| | | |
|---|---|---|
| JP | 2013-114466 A | 6/2013 |
| JP | 2014-209384 A | 11/2014 |
| JP | 2014-209385 A | 11/2014 |

\* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/050802 filed on Jan. 13, 2016, which claims priority benefit of Japanese Patent Application No. JP 2015-039548 filed in the Japan Patent Office on Feb. 27, 2015. Each of the above-referenced applications is hereby incorporated herein by reference in its entirety.

TECHNICAL FIELD

The present disclosure relates to an information processing device, an information processing method, and a program.

BACKGROUND ART

In the past, for example, research on graphical user interfaces (GUIs) has been conducted for the purpose of enabling information processing devices such as personal computers (PCs) to operate intuitively. Through such GUIs, for example, a user can select an object such as an icon displayed on a display screen using a pointing device and cause a computer to execute a process corresponding to the selected object.

For example, techniques for causing a digital object to be displayed near a device associated with a digital object on a table surface are described in Patent Literature 1 and Patent Literature 2.

CITATION LIST

Patent Literature

Patent Literature 1: JP 2014-209384A
Patent Literature 2: JP 2014-209385A

DISCLOSURE OF INVENTION

Technical Problem

However, in the techniques described in Patent Literature 1 and Patent Literature 2, there are cases in which a user is unable to understand a correspondence relation between the digital object and the device. For example, in the above-mentioned techniques, the digital object is simply displayed near the device. For this reason, for example, when a plurality of devices are positioned within a narrow range, the user is unable to understand which device is associated with each digital object being displayed.

In this regard, the present disclosure proposes an information processing device, an information processing method, and a program which are novel and improved and capable of presenting a user with a correspondence relation between an operation image and an operating unit in an easy-to-understand manner in a situation in which the operation image and the operating unit are associated with each other.

Solution to Problem

According to the present disclosure, there is provided an information processing device, including: a display control unit configured to perform first display control for causing an operation image to be displayed on a display screen and second display control for causing a first display indicating a correspondence relation between the operation image and an operating unit to be displayed at a position related with the operating unit.

Further, according to the present disclosure, there is provided an information processing method, including: performing first display control for causing an operation image to be displayed on a display screen and second display control for causing a first display indicating a correspondence relation between the operation image and an operating unit to be displayed at a position related with the operating unit.

Further, according to the present disclosure, there is provided a program for causing a computer to function as: a display control unit configured to perform first display control for causing an operation image to be displayed on a display screen and second display control for causing a first display indicating a correspondence relation between the operation image and an operating unit to be displayed at a position related with the operating unit.

Advantageous Effects of Invention

As described above, according to the present disclosure, it is possible to present a user with a correspondence relation between an operation image and an operating unit in an easy-to-understand manner in a situation in which the operation image and the operating unit are associated with each other. Note that the effects described here are not necessarily limitative, and may be any one of the effects described in this specification.

MODE(S) FOR CARRYING OUT THE INVENTION

Figure 1:
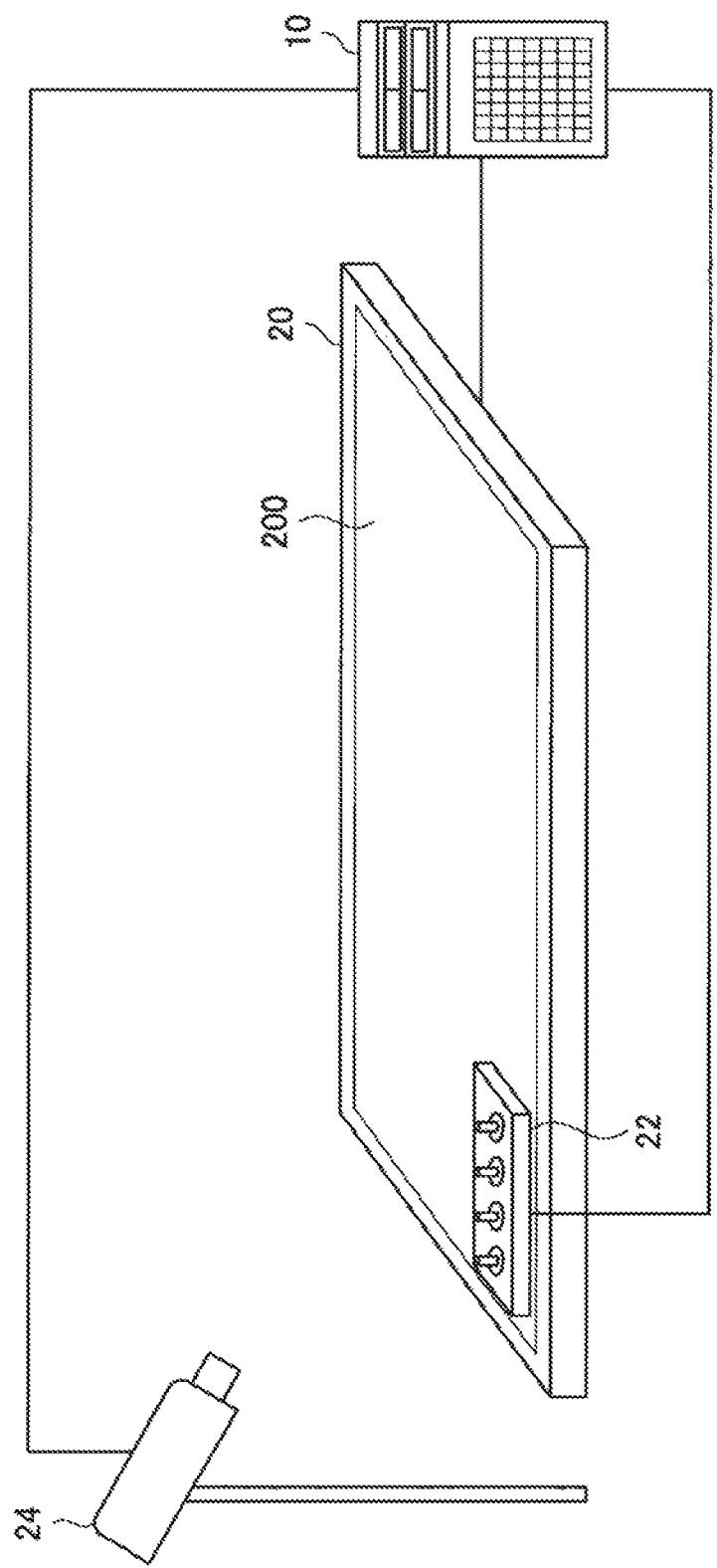
FIG. 1 is an explanatory diagram illustrating a configuration example of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, in this specification and the drawings, a plurality of components having substantially the same functional configuration may be distinguished by adding different letters after the same reference numeral. For example, a plurality of components having substantially the same functional configuration are distinguished, as in a tool 22a and a tool 22b, as necessary. However, when it is not necessary to particularly distinguish a plurality of components having substantially the same functional configuration from each other, only the same reference numeral is added. For example, if it is not necessary to particularly distinguish a tool 22a and a tool 22b from each other, it is referred to simply as a tool 22.

Further, "modes for carrying out the invention" will be described in accordance with the order of sections mentioned below.
1. Basic Configuration of Information Processing System
2. Detailed Description of Embodiments
3. Application Example
4. Hardware Configuration
5. Modified Examples <<1. Basic Configuration of Information Processing System>>

<1-1. Basic Configuration>

The present disclosure can be implemented in a variety of forms as will be described in detail in "2. Detailed description of embodiments" as an example. First, a basic configuration of an information processing system according to the present embodiment will be described with reference to FIG. 1.

As illustrated in FIG. 1, the information processing system according to the present embodiment includes a server 10, a display device 20, a tool 22, and a projector 24.

[1-1-1. Server 10]

The server 10 is an example of the information processing device according to the present disclosure. The server 10 is a device that controls operations of the display device 20 and the projector 24 which will be described later.

Further, the server 10 can perform transmission and reception of information with the display device 20, the tool 22, and the projector 24 through wired communication or wireless communication.

[1-1-2. Display Device 20]

The display device 20 is a device including a display unit 200 that displays a display screen. The display device 20 may be, for example, a table panel type device as illustrated in FIG. 1. Alternatively, the display device 20 may be a device in which a display faces in a horizontal direction such as a monitor for a desktop PC or a rear projection type display in which an internal projector performs projection from a back side of a screen. The following description will proceed with an example in which the display device 20 is a table panel type device.

For example, the display device 20 causes the display unit 200 to display image information received from the server 10. Here, the image information is, for example, screen information of an application.

The display unit 200 is basically configured with a large-sized light-emitting display such as a liquid crystal display (LCD) or an organic light emitting diode (OLED). The display unit 200 may have a touch panel.

Figure 2:
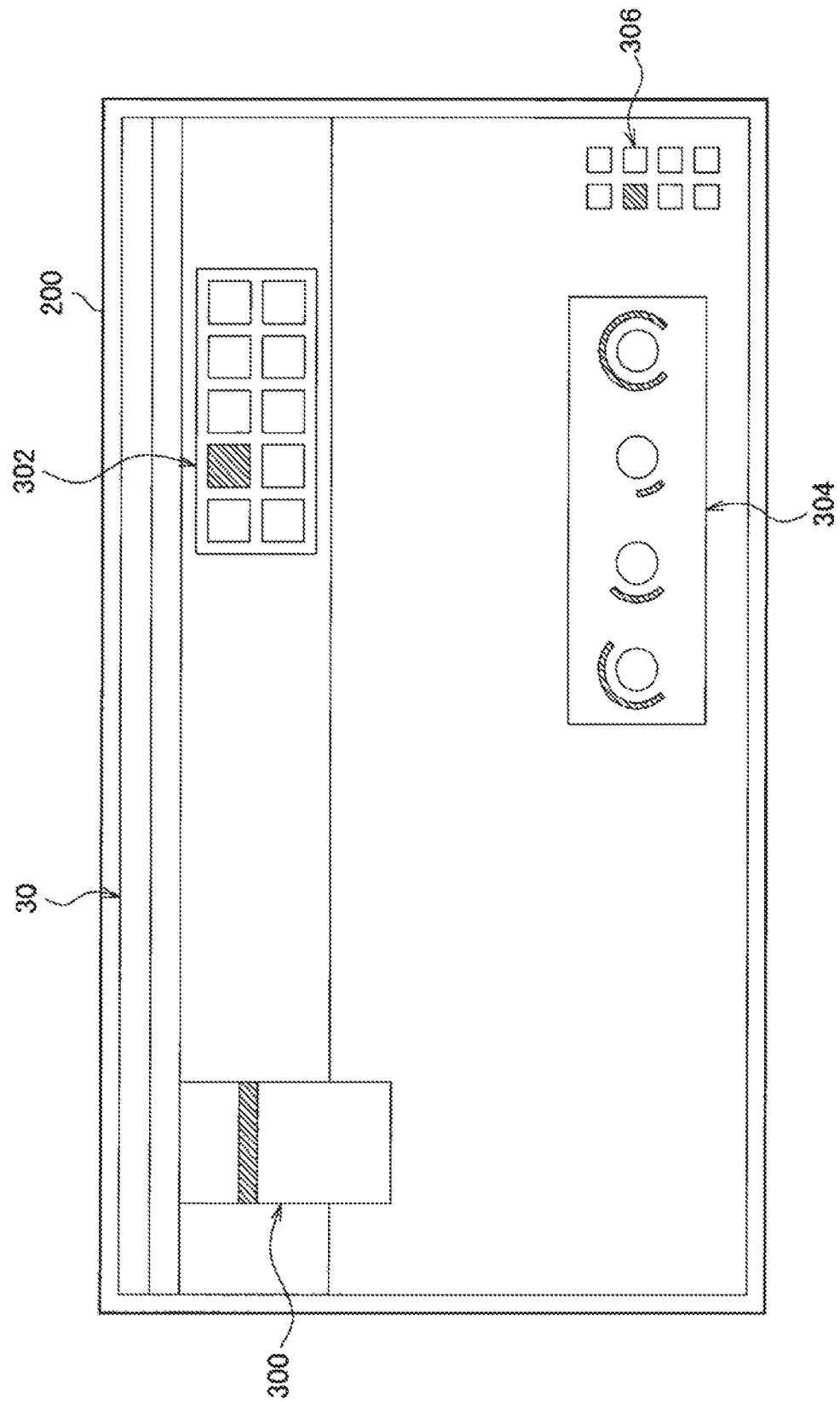
FIG. 2 is an explanatory diagram illustrating a display example of an application screen according to the embodiment.

FIG. 2 is an explanatory diagram illustrating a display example of an application screen (an application screen 30) displayed on the display unit 200. As illustrated in FIG. 2, the application screen 30 includes, for example, a GUI such as a drop-down menu 300, a ribbon 302, a dial 304, and a button 306. Here, the GUI is an example of an operation image in the present disclosure. The GUI is, for example, an image that enables a user to operate a function corresponding to the GUI. For example, the user can cause the server 10 to execute a desired process by selecting one of the plurality of GUIs displayed on the application screen 30 and operating the selected GUI.

The application screen 30 may include only one type of GUI or a plurality of types of GUIs. The following description will proceed with an example in which the application screen 30 includes a plurality of types of GUIs.

[1-1-3. Projector 24]

The projector 24 is an example of a projecting unit in the present disclosure. The projector 24 is a device that projects the image information through light emission. For example, the projector 24 projects the image information received from the server 10.

Further, the projector 24 changes a projection direction in accordance with a control signal received from the server 10.

The projector 24 may be configured to enable the user to manually change the position and the projection direction. Although an example in which only one projector 24 is installed is illustrated in FIG. 1, the present disclosure is not limited to this example, and a plurality of projectors 24 may be installed. It is also possible to cause one piece of content to be displayed through projection from a plurality of projectors 24.

[1-1-4. Tool 22]

The tool 22 is an example of an operating unit in the present disclosure. The tool 22 is a device that enables the user to perform an input to the application. Further, the tool 22 is basically a device having a size and a weight which the user can carry by hand. As will be described below, the tool 22 may be configured in various shapes.

The tool 22 is able to perform wired communication or wireless communication, for example, with the server 10 and transmit information on an operation performed by the user on the tool 22 to the server 10. As a modified example, the tool 22 may include a display on a surface and may cause the image information to be displayed on the display.

(1-1-4-1. Tool 22-1)

Figure 3:
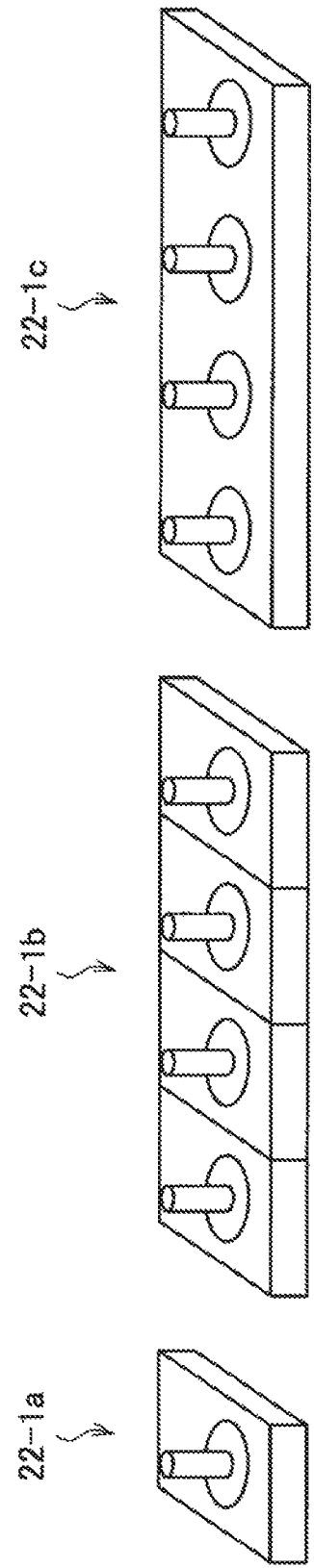
FIG. 3 is an explanatory diagram illustrating an example of an external appearance of a tool 22-1 according to the embodiment.

An example of a shape of the tool 22 will now be described with reference to FIGS. 3 to 8. FIG. 3 is an explanatory diagram illustrating an external appearance of a tool 22-1 which is an example of the shape of the tool 22. The tool 22-1 includes a stick 222 that enables the user to perform an operation. The tool 22-1 may have a shape having only one operation system such as a tool 22-1*a* illustrated in a left diagram of FIG. 3. Alternatively, the tool 22-1 may have a shape in which a plurality of operation systems 220 each having the same shape as the tool 22-1*a*, for example, four operating systems, are combined such as a tool 22-1*b* illustrated in a center drawing of FIG. 3. Alternatively, the tool 22-1 may have a shape in which a plurality of operation systems 220 each having the same shape as the tool 22-1*a*, for example, four operating systems, are formed integrally such as a tool 22-1*c* illustrated in a right diagram of FIG. 3.

Figure 4:
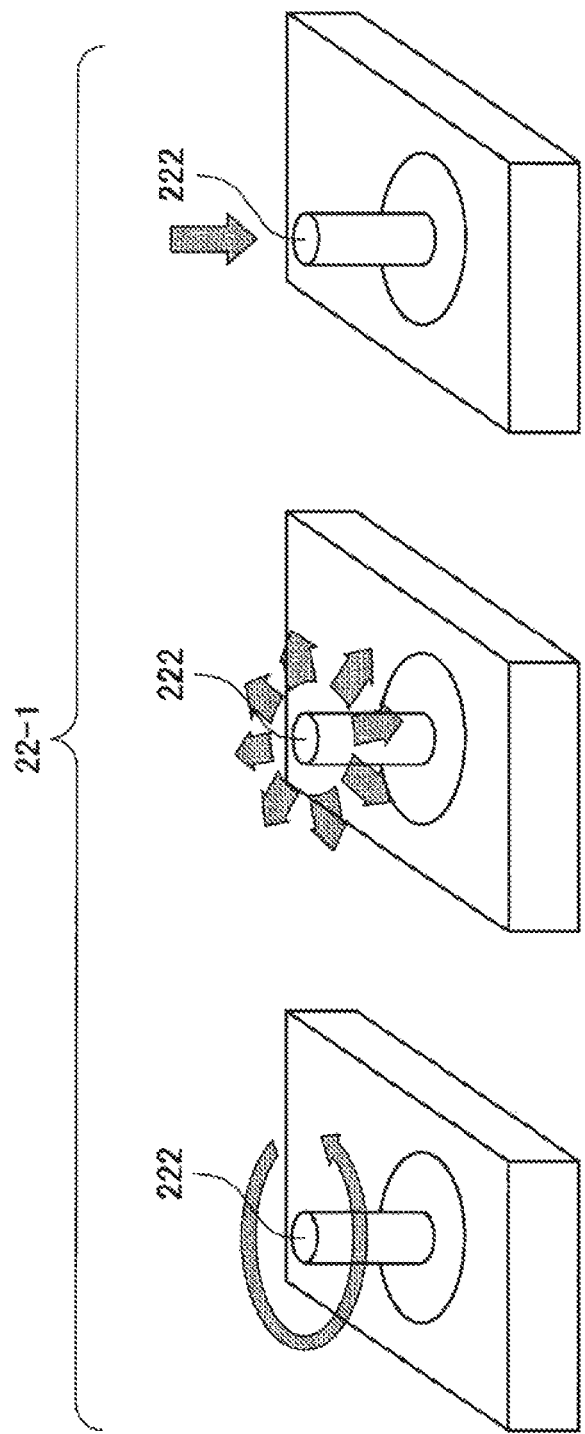
FIG. 4 is an explanatory diagram illustrating an example of an operation of the tool 22-1 according to the embodiment.

In the tool 22-1, the user can operate the stick 222, for example, using an operation method illustrated in FIG. 4. For example, the user may be able to rotate the stick 222 of the tool 22-1 counterclockwise and/or clockwise as indicated by an arrow in the left diagram of FIG. 4. Further, it is possible to perform an operation of pushing the stick 222 in eight directions, that is, front, rear, left, right, and diagonal directions, as indicated by eight arrows in the center diagram of FIG. 4. Further, it is possible to perform an operation of pushing the stick 222 downward as indicated by a downward arrow in the right diagram of FIG. 4. Alternatively, the user may be able to pinch the stick 222 and pull it up.

For example, the rotation, the pushing, or the pressing of the stick 222 illustrated in FIG. 4 may be detectable through an electronic device included in the tool 22-1. Alternatively, when the display unit 200 includes a touch panel and the tool 22-1 is arranged on the display unit 200, the detection of the operations of the stick 222 is performed by the display unit 200 detecting pressure at the time of an operation performed on the tool 22-1. Further, when the display unit 200 includes a touch panel, the display device 20 may automatically recognize the position of the tool 22 arranged on the display unit 200 and disable a touch sensor in a display region in which the tool 22 is arranged. Accordingly, an erroneous touch operation can be prevented.

(1-1-4-2. Tool 22-2)

Figure 5:
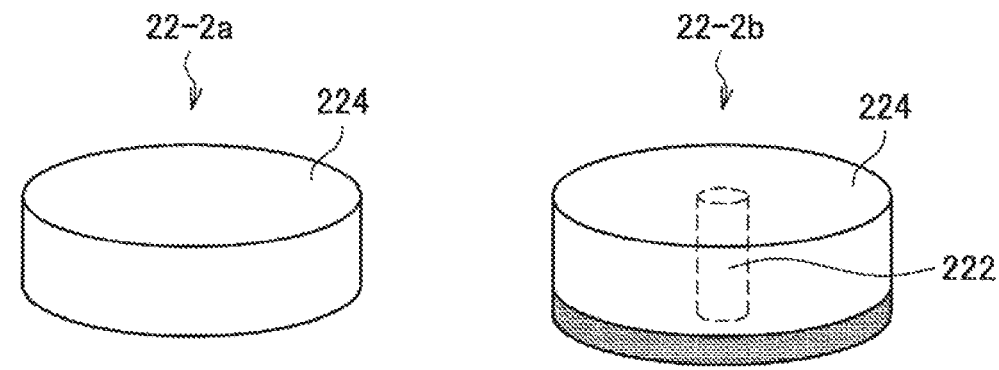
FIG. 5 is an explanatory diagram illustrating an example of an external appearance of a tool 22-2 according to the embodiment.

FIG. 5 is an explanatory diagram illustrating an example of an external appearance of a tool 22-2 (a tool 22-2*a* and a tool 22-2*b*) which is another example of the shape of the tool 22. This tool 22-2 includes, for example, an invisible marker 224 on the surface of the tool 22-2. For example, the invisible marker 224 is technically readable on the basis of an image or the like captured by an infrared camera and is a marker which is invisible to the user. As will be described in detail later, in the tool 22-2, content of an operation performed by the user on the tool 22-2 can be recognized on the basis of a detection result of an operation of the invisible marker 224 such as rotation.

The tool 22-2 may have a single-stage configuration as in the tool 22-2*a* illustrated in the left diagram of FIG. 5 or may have a two-stage configuration as in the tool 22-2*b* as illustrated in the right diagram of FIG. 5. Further, the tool 22-2*b* may include a stick 222 on the inside as illustrated in FIG. 5. Then, when the user presses the tool 22-2*b* downward, a click feeling may be given to the user as the stick 222 is pressed down. In the tool 22-2*b*, for example, when the user rotates the tool 22-2*b* by hand, a weight at the time of rotation may be given to the user.

Figure 6:
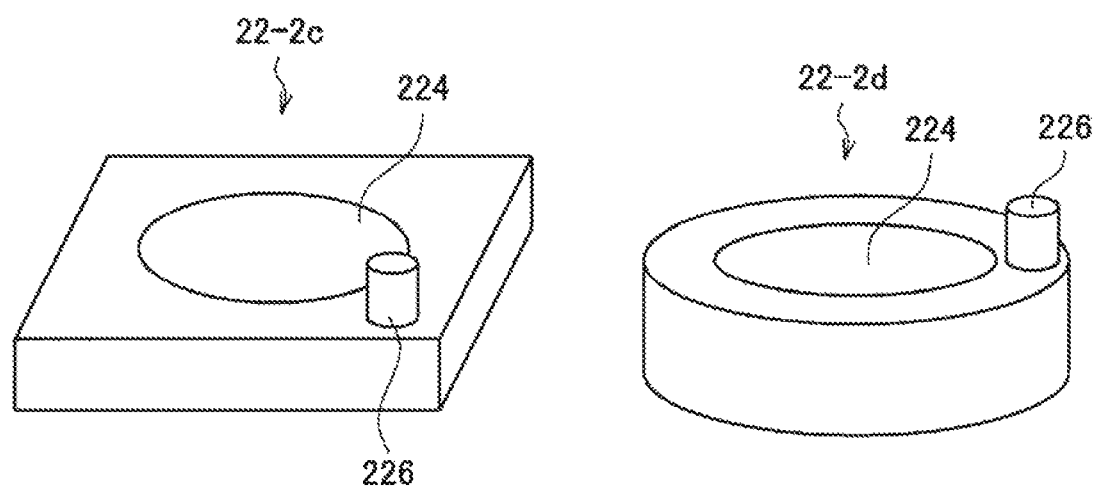
FIG. 6 is an explanatory diagram illustrating an example of an external appearance of the tool 22-2 according to the embodiment.

FIG. 6 is an explanatory diagram illustrating another example of the shape of the tool 22-2 (a tool 22-2*c* and a tool 22-2*d*). As illustrated in FIG. 6, each of the tool 22-2*c* and the tool 22-2*d* includes a dial portion 226 that enables the user to perform a rotational operation and a decision operation, and the dial portion 226 and the invisible marker 224 are arranged apart from each other. In the tool 22-2*c* and the tool 22-2*d*, basically, the user performs an operation only on the dial portion 226. Therefore, it is possible to prevent the invisible marker 224 from being blocked (hidden) by the hand of the user.

Figure 7:
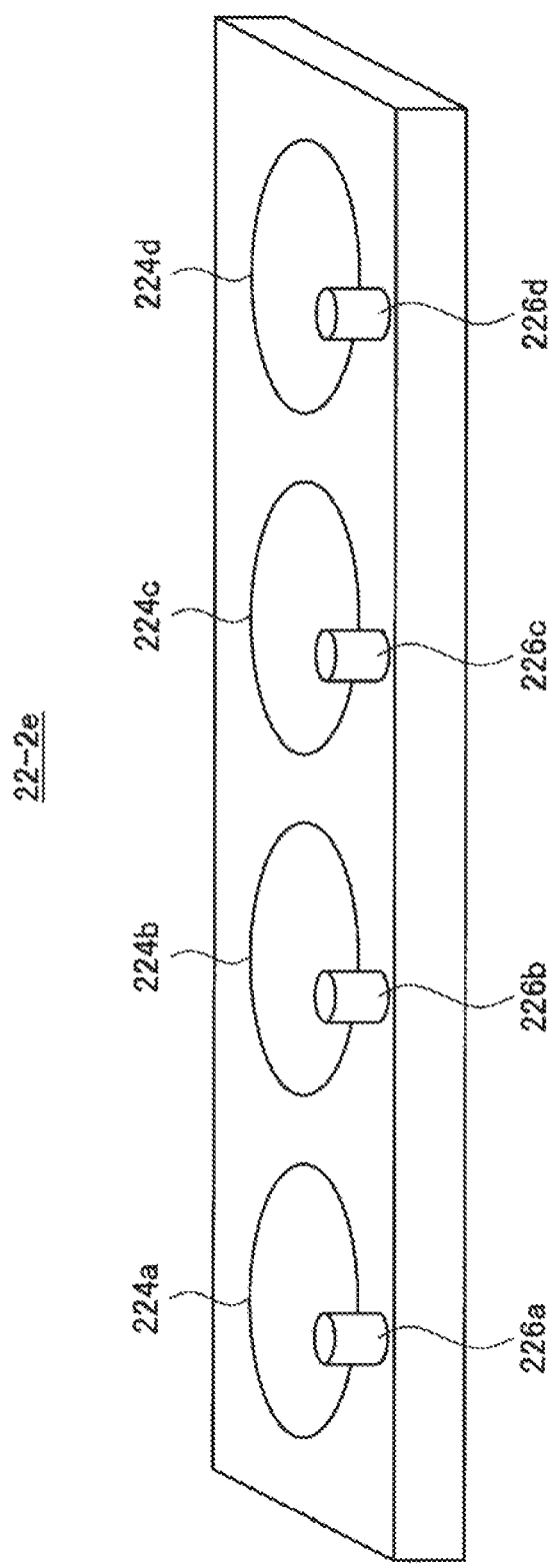
FIG. 7 is an explanatory diagram illustrating an example of an external appearance of a surface of the tool 22-2 according to the embodiment.
Figure 8:
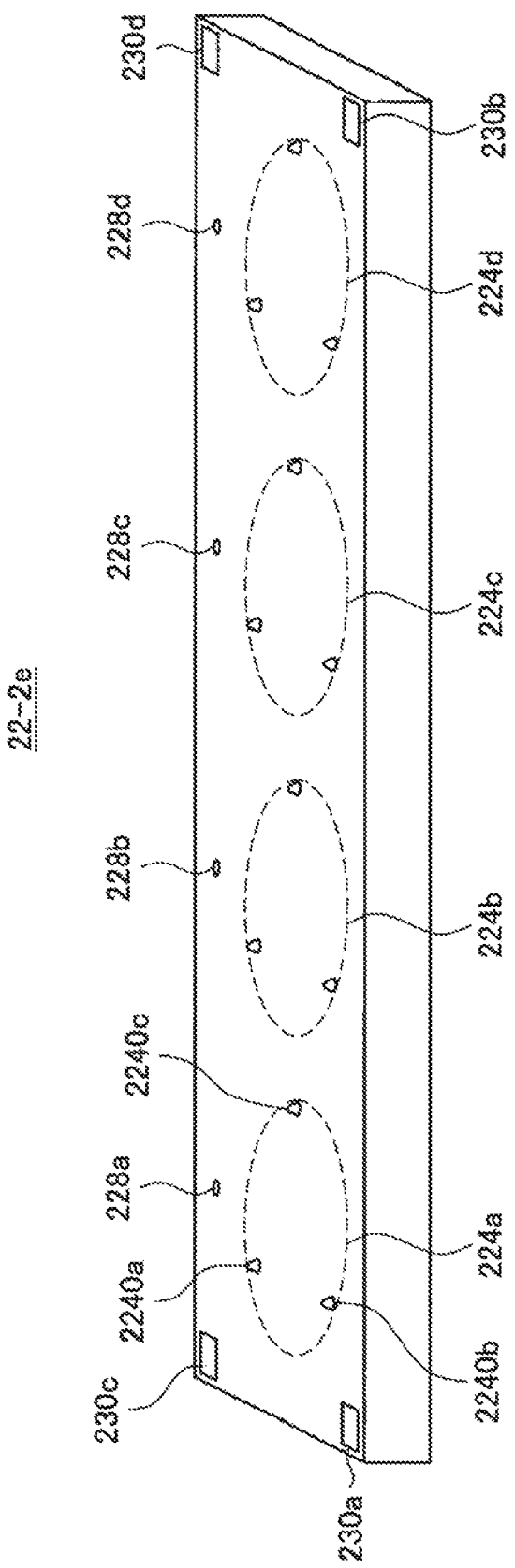
FIG. 8 is an explanatory diagram illustrating an example of an external appearance of a back side of the tool 22-2 according to the embodiment.

FIGS. 7 and 8 are explanatory diagrams illustrating another example of the shape of the tool 22-2 (a tool 22-2*e*). FIG. 7 is an explanatory diagram illustrating an external appearance of the surface of the tool 22-2*e*, and FIG. 8 is an explanatory diagram illustrating an external appearance of the back side of the tool 22-2*e*.

As illustrated in FIG. 7, the tool 22-2*e* has a shape in which a plurality of operation systems 220 each having the same shape as the tool 22-2*c* illustrated in FIG. 6, for example, four operating systems 200, are combined.

Further, as illustrated in FIG. 8, the tool 22-2*e* includes a conductor 228 on the back of each dial portion 226. For example, when the display unit 200 includes a touch panel, the tool 22-2*e* is arranged on the display unit 200, and the dial portion 226 is pressed down by the user, for example, the display device 20 can recognize that the dial portion 226 has been pressed down via the conductor 228.

Further, as illustrated in FIG. 8, the tool 22-2*e* may include a plurality of protrusions 2240 at positions corresponding to the individual invisible markers 224, for example, at three points on the back side of the tool 22-2*e*. According to this configuration, for example, when the display unit 200 includes a touch panel, the tool 22-2*e* is arranged on the display unit 200, and any one dial portion 226 is rotated by the user, for example, the display device 20 can recognize that the invisible marker 224 corresponding to the dial portion 226 is rotating (even without detecting the invisible marker 224).

Further, for example, slip stoppers 230 may be arranged at four corners on the back surface of the tool 22-2e as illustrated in FIG. 8.

The tools 22-2a to 22-2d illustrated in FIGS. 5 and 6 may include a conductor 228, a plurality of protrusions 2240, and a slip stopper 230, similarly to the tool 22-2e. The tool 22-1 illustrated in FIG. 3 may include a conductor 228 and a slip stopper 230 as well.

Modified Example

As a modified example, the tool 22-2 may have a marker that is visible to humans (hereinafter referred to as a "visible marker") instead of the invisible marker 224. For example, the visible marker can be read on the basis of an image captured by a camera capable of sensing visible light. Further, a spatial position, a posture, and an ID of the visible marker may be image-recognized on the basis of the captured image, and recognized information may be used as the operation information of the user.

The tool 22 has been described above. In the following description, the tools 22-1 and 22-2 illustrated in FIGS. 3 to 8 are referred to simply as a "tool 22" when it is not particularly necessary to distinguish them.

The information processing system according to the present embodiment is not limited to the above configuration. For example, FIG. 1 illustrates an example in which the projector 24 projects an image on the display unit 200 (or the tool 22), but the present disclosure is not limited to this example. For example, the projector 24 is also able to project an image onto a desk (not illustrated) on which, for example, the projector 24 is arranged. In this modified example, the tool 22 is arranged on the desk. Further, the display device 20 may be a desktop type monitor arranged on the desk.

The information processing system may further have one or more cameras. Further, for example, the server 10 is also able to detect a distance between a projection plane on which the projector 24 performs projection and a projection target object and an operating body (for example, a finger, a stylus, or the like) using an image recognition (depth sensing) technique of a camera. Further, a touch interaction of the user on the GUI projected by the projector 24 may be performed on the basis of a distance detection result.

<1-2. Description of Problems>

Meanwhile, when a GUI displayed on a large display is desired to be operated using a mouse, it is necessary to increase a moving distance of a mouse pointer. For this reason, much time and effort are expended in an input operation of the user, and operation efficiency is low.

Further, in most application screens, a plurality of types of GUIs are typically arranged, and individual GUIs are scattered and arranged at various positions in the screen, similarly to the application screen 30 illustrated in FIG. 2. For example, in the example illustrated in FIG. 2, the drop-down menu 300 is arranged on the upper left of the application screen 30, and the button 306 is arranged on the lower right. When a plurality of GUIs are desired to be operated using the mouse, it is necessary for the user to move the mouse pointer far between the upper left and the lower right in the application screen 30. Further, it is necessary for the user to move his/her line of sight far to check the position of the mouse pointer displayed on the application screen 30.

When the display includes a touch panel, there is the merit that the user can directly touch his/her desired position in the display screen, compared to the mouse. On the other hand, when the user desires to operate a position far away from him/her, it is necessary for the user to move his/her hand largely, and much time and effort are expended in the operation. Further, since a distance to move the finger (and the arm) and the line of sight increases as the display size increases, the operation takes a long time.

In this regard, the server 10 according to the present embodiment has been created in view of the above circumstances. In the server 10 according to the present embodiment, a plurality of GUI functions are associated with one tool 22, and thus the user can perform a desired operation collectively by hand. Further, the server 10 can cause the correspondence relation between the GUI and the tool 22 to be displayed so that it can be easily understood by the user. Hereinafter, the present embodiment will be described in detail in order.

<<2. Detailed Description of Embodiments>>

<2-1. Configuration>

Figure 9:
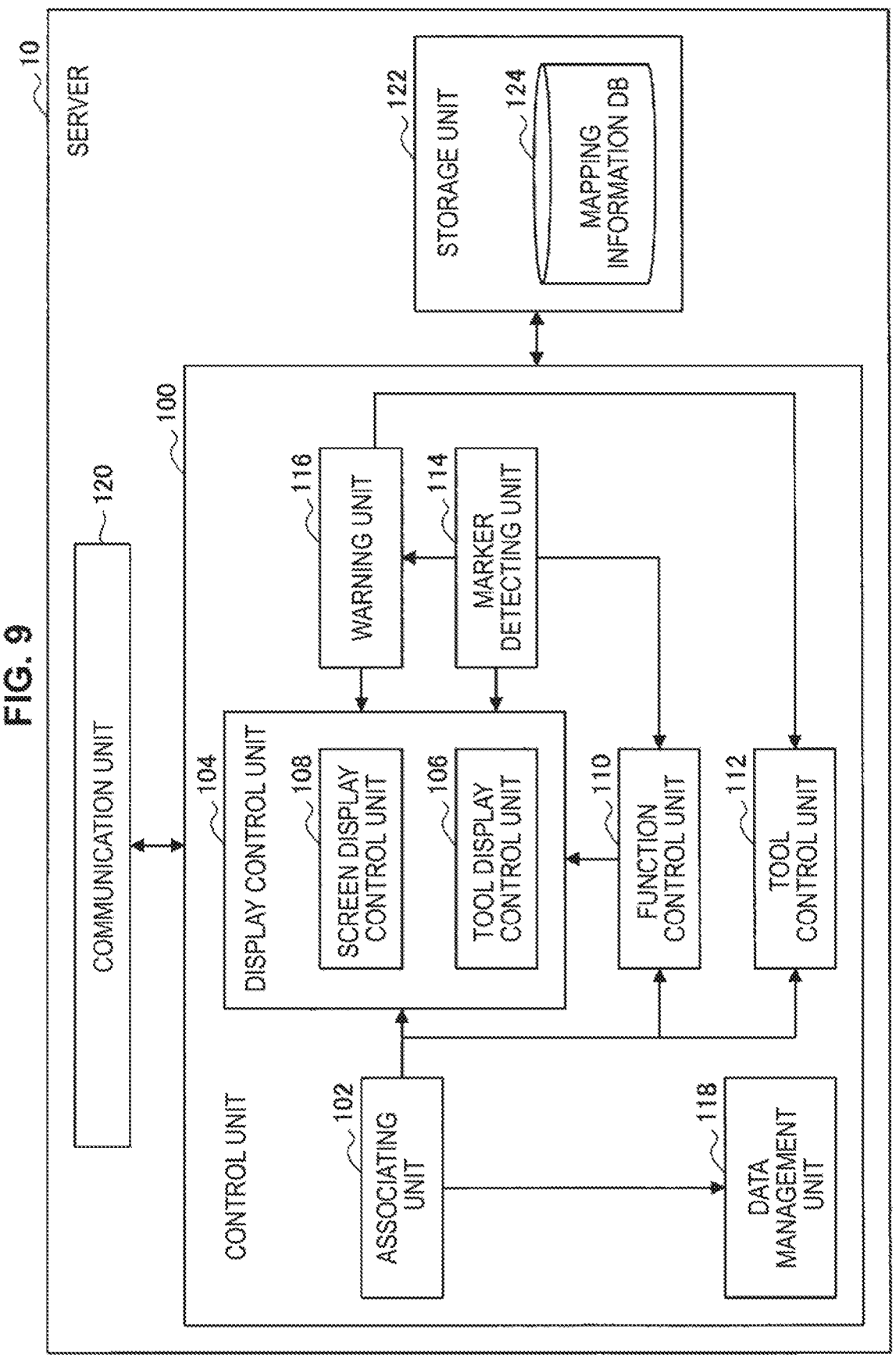
FIG. 9 is a functional block diagram illustrating a configuration example of a server 10 according to the embodiment.

First, a configuration according to the present embodiment will be described in detail. FIG. 9 is a functional block diagram illustrating a configuration of the server 10 according to the present embodiment. As illustrated in FIG. 9, the server 10 includes a control unit 100, a communication unit 120, and a storage unit 122.

[2-1-1. Control Unit 100]

The control unit 100 generally controls the operation of the server 10 using hardware such as a central processing unit (CPU) 150, a random access memory (RAM) 154, and the like which are installed in the server 10. As illustrated in FIG. 9, the control unit 100 includes an associating unit 102, a display control unit 104, a function control unit 110, a tool control unit 112, a marker detecting unit 114, a warning unit 116, and a data management unit 118. The display control unit 104 also has a tool display control unit 106 and a screen display control unit 108.

[2-1-2. Associating Unit 102]

The associating unit 102 associates the GUI selected by the user with the tool 22 on the basis of a predetermined operation performed on the tool 22 and selection of the GUI displayed on the display screen by the user. For example, when any one of a plurality of GUIs displayed on the display screen is selected by the user while the user is performing a predetermined operation on the tool 22, the associating unit 102 associates the selected GUI with the tool 22.

Figure 10:
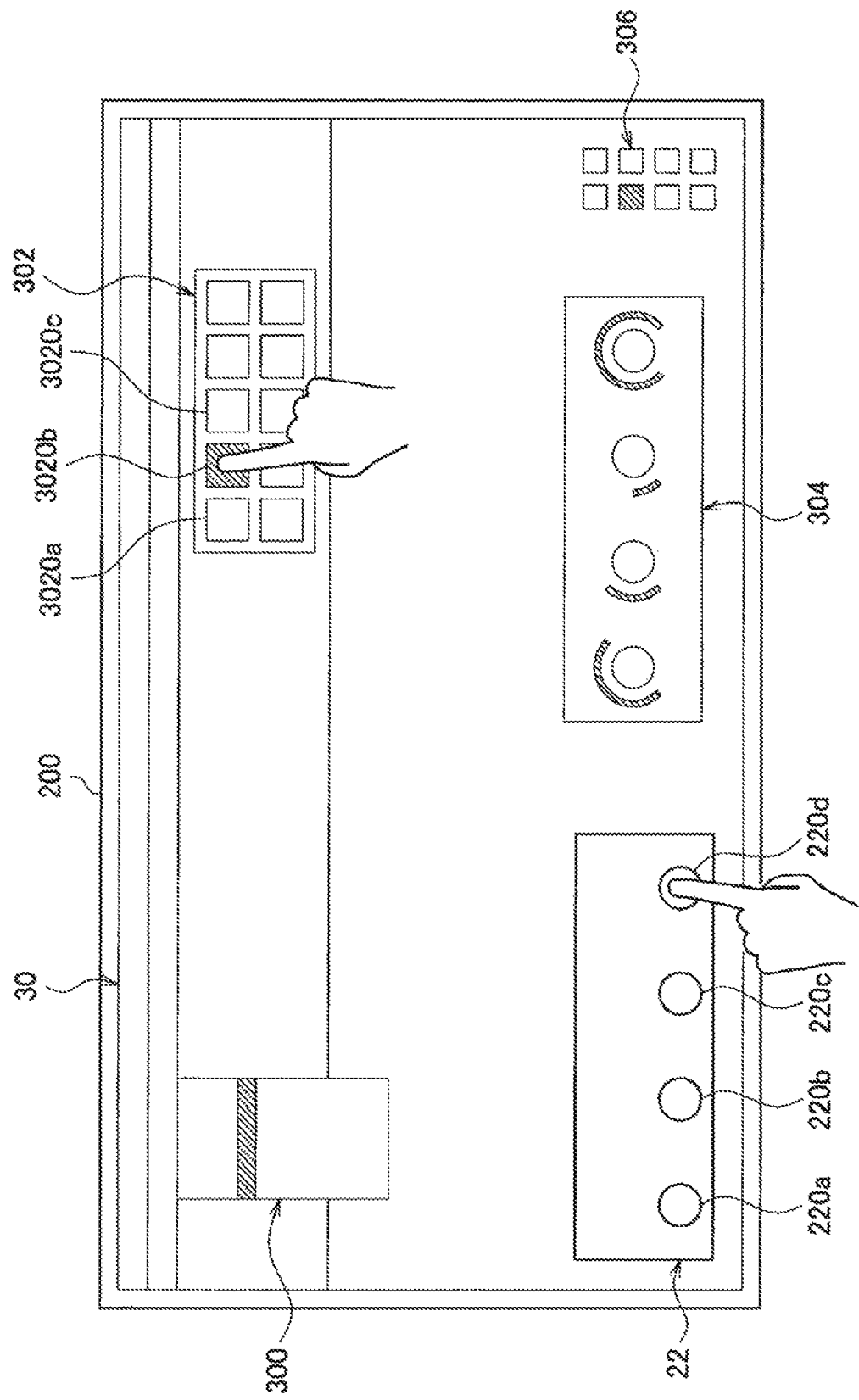
FIG. 10 is an explanatory diagram illustrating an operation example at the time of association of a GUI and a tool 22 according to the embodiment.

Here, the above function will be described in further detail with reference to FIG. 10. FIG. 10 illustrates an example in which the application screen 30 illustrated in FIG. 2 is displayed on the display unit 200, and the tool 22 is arranged on the display unit 200 (for example, the lower left position in FIG. 10) by the user. In the example illustrated in FIG. 10, the tool 22 is assumed to have a shape in which a plurality of operation systems 220, for example, four operation systems, are combined. Further, in FIG. 10, the user is assumed to desire to associate a specific button 3020b included in the ribbon 302 with an operation system 220d.

For example, in the case in which the tool 22 has a decision mechanism to be described later, the decision mechanism of the operation system 220d is first operated by the user, and then when the user selects the button 3020b in application screen 30 while the operation is being performed, the associating unit 102 associates the button 3020b with the operation system 220d as illustrated in FIG. 10. Accordingly, thereafter, the user can operate a function corresponding to the button 3020b through the operation system 220d.

Here, in the case in which the tool 22 includes the stick 222, for example, the decision mechanism of the tool 22 may be a mechanism for quickly rotating the stick 222 illustrated in the left diagram of FIG. 4 right and left or may be a mechanism for pushing the stick illustrated in the right diagram of FIG. 4B downward.

Further, when the tool 22 has no decision mechanism, the associating unit 102 associates the button 3020b with the operation system 220d on the basis of an operation of the user during activation of a mapping mode of an application. For example, when a plurality of GUIs displayed on the application screen are sequentially selected by the user during the activation of the mapping mode, for example, the associating unit 102 sequentially associates the selected GUI with each operation system 220.

As an example of a GUI selection method in the application screen 30, a method of the user touching the displayed GUI with his/her finger or a stylus, a method of clicking the displayed GUI with the mouse (after moving the mouse pointer to the position of the GUI), or the like may be used.

[2-1-3. Tool Display Control Unit 106]
(2-1-3-1. Tool Display Control Example 1)

The tool display control unit 106 is an example of a display control unit according to the present disclosure. When the GUI is associated with the tool 22 through the associating unit 102, the tool display control unit 106 causes a display indicating the correspondence relation between the GUI and the tool 22 to be displayed at a position related to the tool 22. For example, in this case, the tool display control unit 106 causes the projector 24 to project the display indicating the correspondence relation between the GUI and the tool 22 onto the position related to the tool 22. Alternatively, in this case, the tool display control unit 106 causes (a display included in) the tool 22 to display the display indicating the correspondence relation.

Here, the position associated with the tool 22 may be, for example, immediately above the tool 22, near such as beside the tool 22, or it may be on the surface of the tool 22. Further, the display illustrating the correspondence relation between the GUI and the tool 22 may include a part of the GUI image associated with the tool 22.

Figure 11:
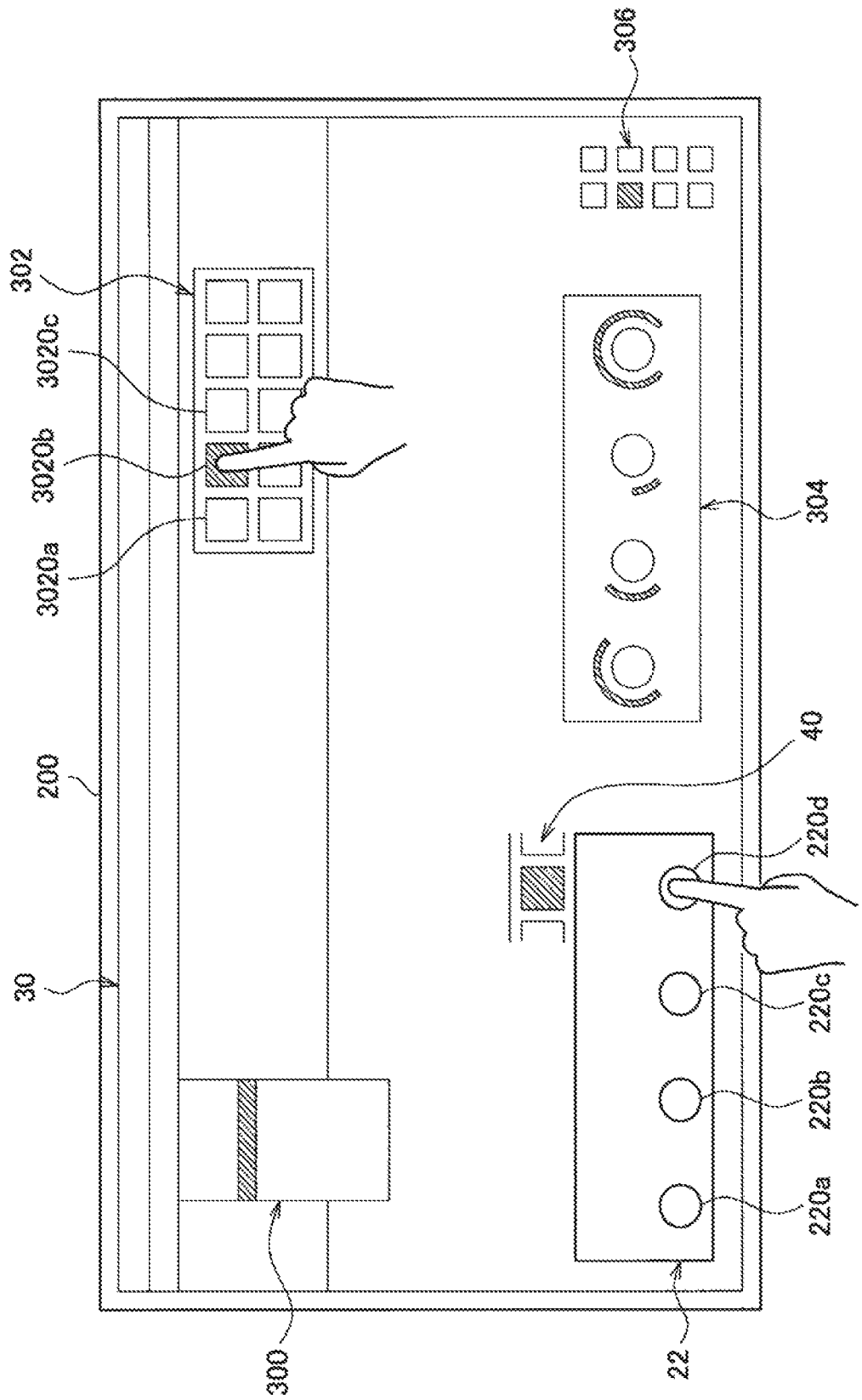
FIG. 11 is an explanatory diagram illustrating a display example of a display indicating a correspondence relation between the GUI and the tool 22 according to the embodiment.

Here, the above operation will be described in further detail with reference to FIG. 11 and FIG. 12. FIG. 11 is an explanatory diagram illustrating a projection example of the display indicating the correspondence relation between the GUI and the tool 22 after the operation illustrated in FIG. 10 is performed. As illustrated in FIG. 11, for example, the tool display control unit 106 causes the projector 24 to project a mapping GUI display 40 indicating the association between the button 3020b and the operation system 220d onto a region above the operation system 220d in the display screen. For example, the mapping GUI display 40 may be an image obtained by cutting an image of a region including the button 3020b in the display screen illustrated in FIG. 11 without change. Alternatively, the mapping GUI display 40 may be an image obtained by arbitrarily changing a shape and a size of the image of the button 3020b. For example, when the image of the button 3020b is enlarged and projected, the visibility of the mapping GUI display 40 can be improved.

Figure 12:
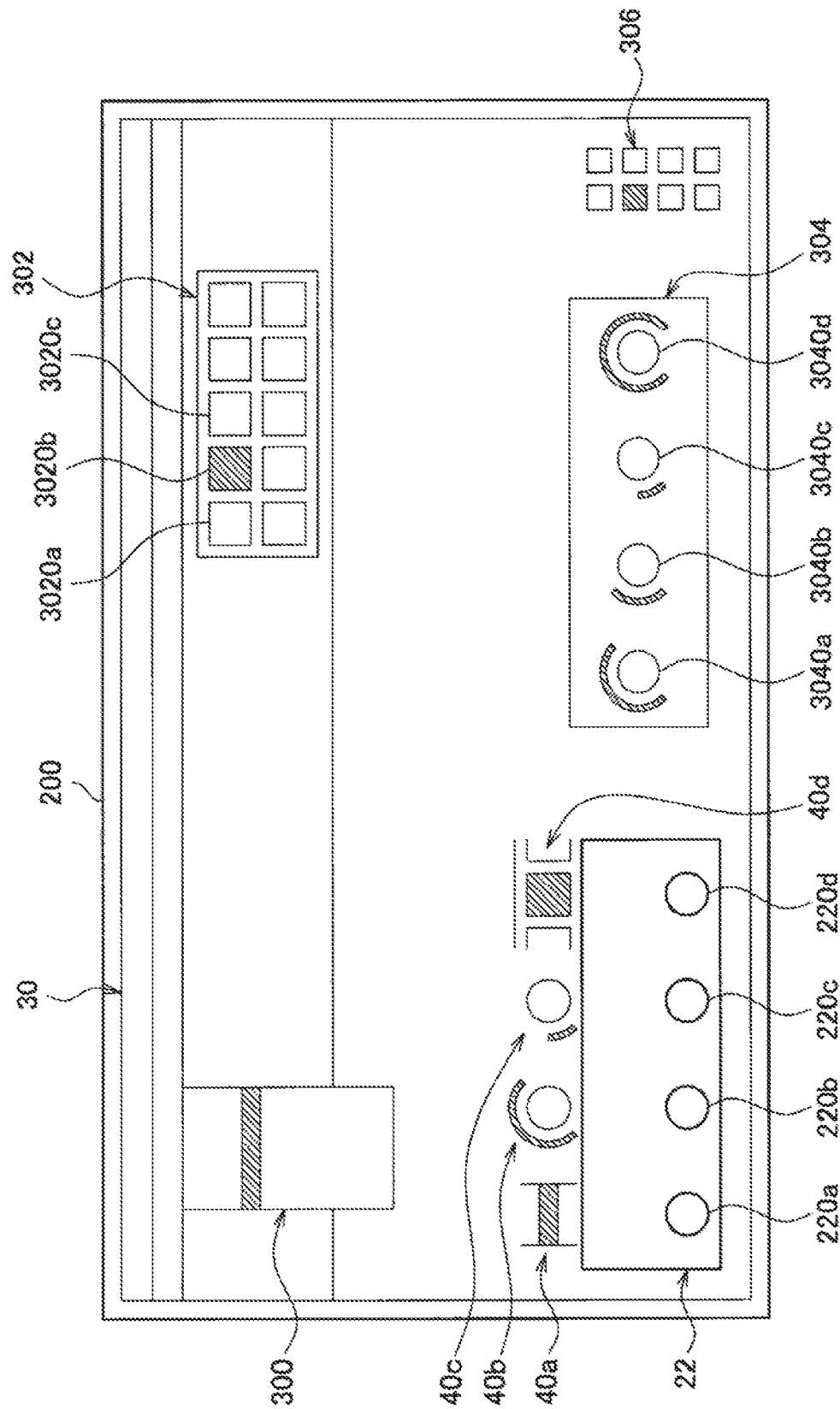
FIG. 12 is an explanatory diagram illustrating a display example of a display indicating a correspondence relation between the GUI and the tool 22 according to the embodiment.

FIG. 12 is an explanatory diagram illustrating a projection example when all the operation systems 220 included in the tool 22 are associated with the GUIs in the application screen 30 illustrated in FIG. 11. For example, when an operation system 220a is associated with the drop-down menu 300 through the associating unit 102, the tool display control unit 106 causes the projector 24 to project a mapping GUI display 40a indicating the association between the drop-down menu 300 and the operation system 220a onto a region above the arrangement position of the operation system 220a in the display unit 200 as illustrated in FIG. 12. Similarly, the tool display control unit 106 causes the projector 24 to project a mapping GUI display 40b indicating the association between a dial 3040a and an operation system 220b onto a region above the arrangement position of the operation system 220b in the display unit 200. The same applies to an operation system 220c.

Here, the position onto which the mapping GUI display 40 is projected may be fixed. Alternatively, the user may freely change the position onto which the mapping GUI display 40 is projected, for example, in accordance with an input of the user to an application, an operation of the user on a corresponding operation system 220, or the like.

Further, the shape and the size of the mapping GUI display 40 to be projected may be freely set or changed by the user. Regarding a GUI frequently used by the user, the shape and size of the mapping GUI display 40 may be set in advance.

Modified Example

As a modified example, the tool display control unit 106 may cause the projector 24 to project the mapping GUI display 40 darkly while the user is not operating it. Furthermore, the tool display control unit 106 may cause the projector 24 to brighten the mapping GUI display 40 and project it when the user resumes the operation.

(2-1-3-2. Tool Display Control Example 2)

Further, when the GUI is associated with the tool 22 through the associating unit 102, for example, the tool display control unit 106 is able to cause the projector 24 to project a display of the same color as a color of a line displayed around the GUI through the screen display control unit 108 to be described later onto the position related to the tool 24 or cause the tool 22 to display it.

Figure 13:
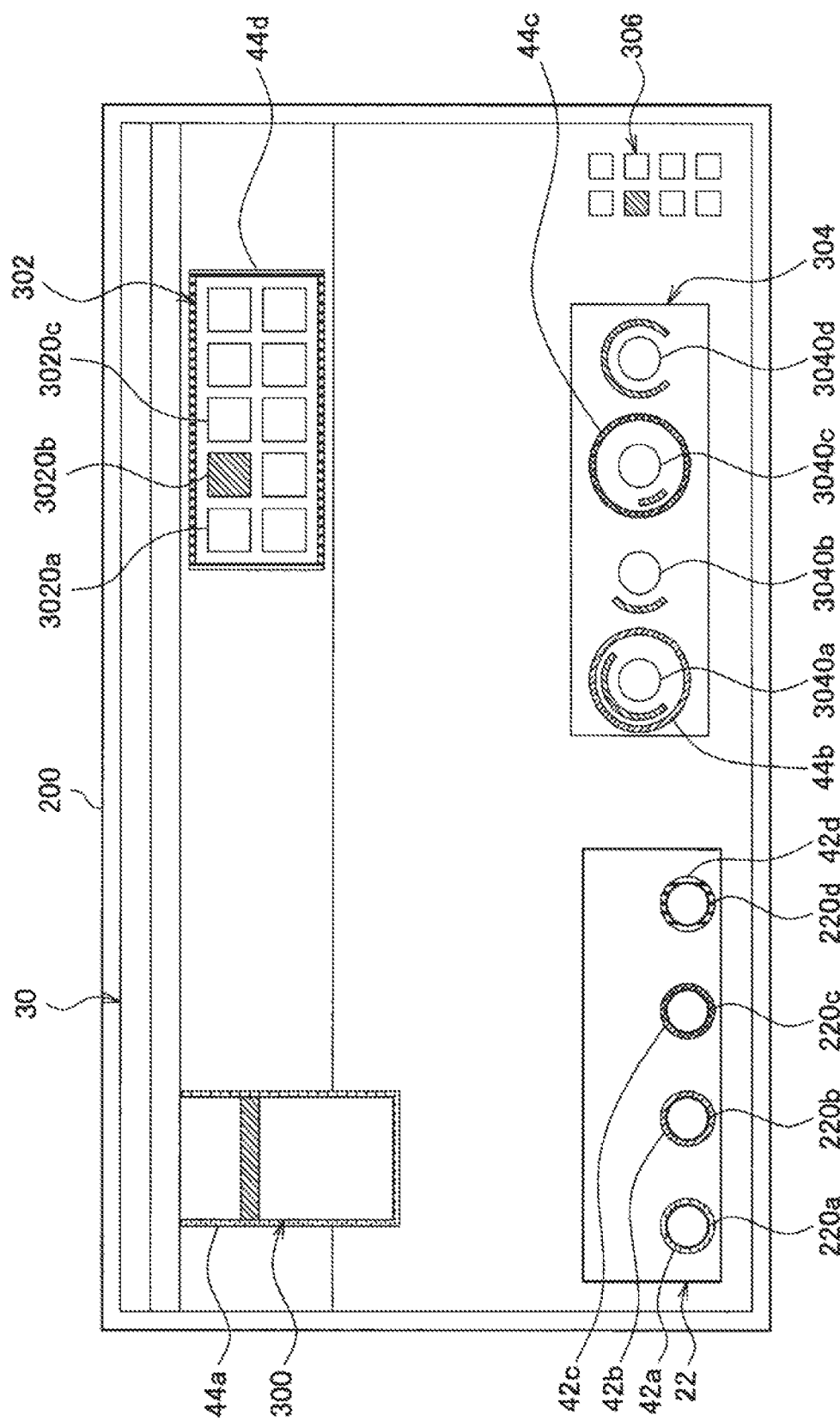
FIG. 13 is an explanatory diagram illustrating a display example of a display indicating a correspondence relation between the GUI and the tool 22 according to the embodiment.

Here, the above operation will be described in further detail with reference to FIG. 13. FIG. 13 is an explanatory diagram illustrating another display example when all the operation systems 220 included in the tool 22 are associated with the GUIs in the application screen 30 illustrated in FIG. 11. As illustrated in FIG. 13, for example, the tool display control unit 106 causes the projector 24 to project a mapping-related display 42a of the same color as a color of a line 44a displayed around the drop-down menu 300 (associated with the operation system 220a) onto the surface of the operation system 220a or causes the operation system 220a to emit light. Similarly, the tool display control unit 106 causes the projector 24 to project a mapping-related display 42b of the same color as a color of a line 44b displayed around the dial 3040a (associated with the operation system 220b) onto the surface of the operation system 220b or causes the operation system 220b to display it. The same applies to the operation system 220c and the operation system 220d.

(2-1-3-3. Tool Display Control Example 3)

Further, the tool display control unit 106 is able to cause the projector 24 to project the mapping GUI display 40 according to a changed image of the GUI each time an image of the GUI associated with the tool 22 is changed through the screen display control unit 108 to be described later.

Further, each time a value of a parameter related to a function of the GUI associated with the tool 22 is adjusted through the function control unit 110 to be described later, the tool display control unit 106 is able to cause the projector 24 to project the mapping GUI display 40 in a form according to a changed parameter value. For example, each time the value of the parameter is adjusted, the tool display control unit 106 changes the value of the parameter included in the mapping GUI display 40 to the adjusted value and causes the projector 24 to project the changed mapping GUI display 40.

Figure 14:
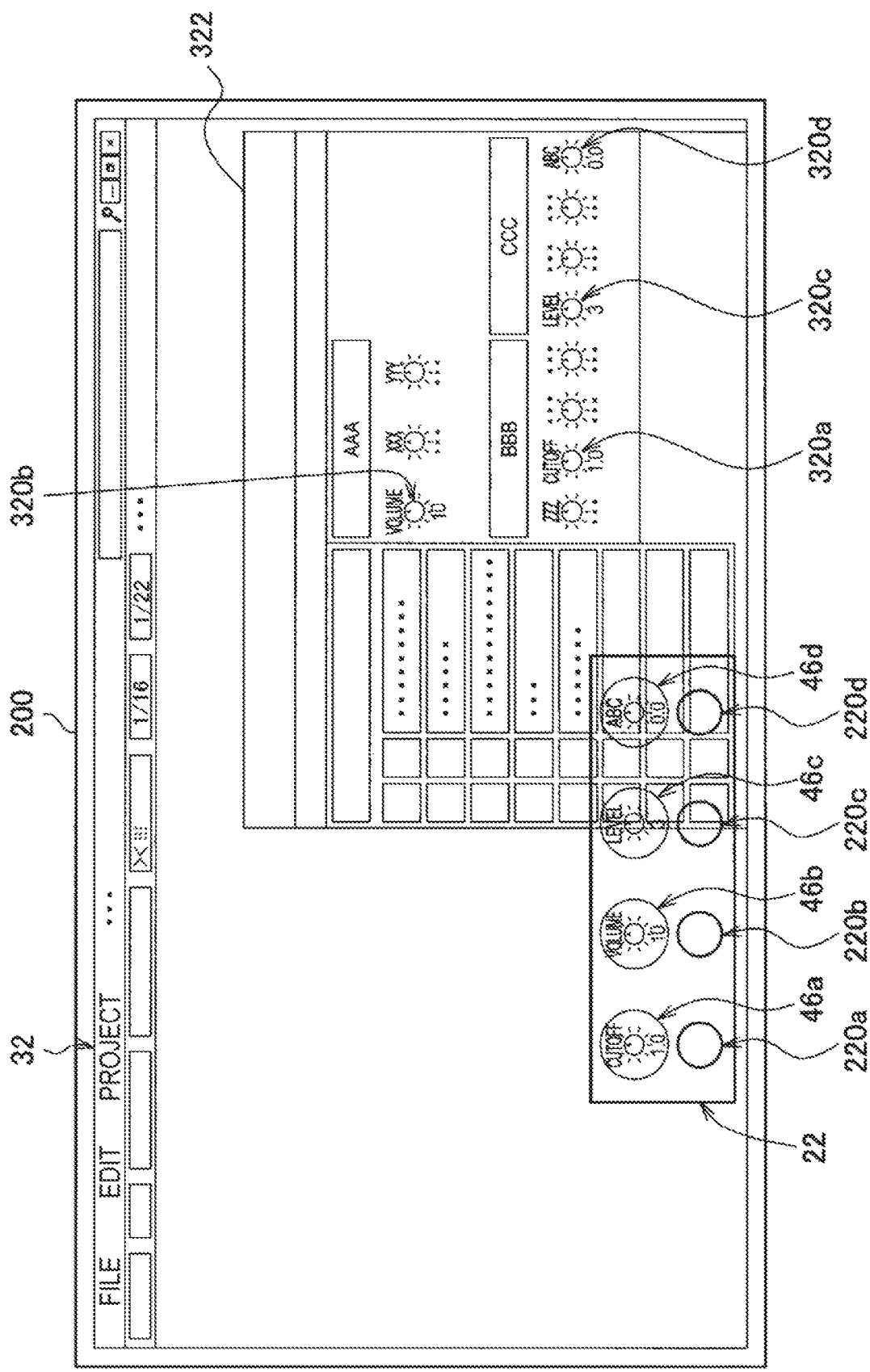
FIG. 14 is an explanatory diagram illustrating a display example of a display indicating a correspondence relation between the GUI and the tool 22 according to the embodiment.

Here, the above operation will be described in further detail with reference to FIGS. 14 and 15. FIG. 14 is an explanatory diagram illustrating an example in which another application screen (application screen 32) is displayed on the display unit 200. The application screen 32 is, for example, a music related application screen. Further, the application screen 32 includes a window 322 including a plurality of dials 320 as illustrated in FIG. 14. Here, for example, the dial 320 is a GUI used for the user to adjust a value of a parameter previously associated with the dial 320 such as "volume." Further, as illustrated in FIG. 14, the dial 320 includes a display region of the value of the parameter associated with the dial 320. For example, "10" is displayed in the dial 320b labeled "VOLUME" as the value of the parameter associated with the dial 320b.

Further, in FIG. 14, the respective operation systems 220 are assumed to be associated with the respective dials 320 through the associating unit 102, for example, such that the operation system 220a included in the tool 22 is associated with a dial 320a labeled "CUTOFF." Further, FIG. 14 illustrates an example in which the tool 22 is arranged at a position at which the tool 22 partially overlaps the display region of the window 322 in the display unit 200.

As illustrated in FIG. 14, for example, the tool display control unit 106 causes the projector 24 to project an image 46a of the dial 320a associated with the operation system 220a onto the surface of the operation system 220a. For example, the tool display control unit 106 causes the projector 24 to project the image 46a of the dial 320a onto the invisible marker 224 of the operation system 220a. Here, as illustrated in FIG. 14, the image 46a of the dial 320a includes a value of a parameter related to the function of the dial 320a ("1.0" in the example illustrated in FIG. 14).

Similarly, the tool display control unit 106 causes the projector 24 to project an image 46b of a dial 320b (labeled "VOLUME") associated with the operation system 220b onto the surface of the operation system 220b. The image 46b of the dial 320b includes a value of a parameter related to the function of the dial 320b ("10" in the example illustrated in FIG. 14). The same applies to the operation system 220c and the operation system 220d.

As illustrated in FIG. 14, as a modified example, the tool display control unit 106 is also possible to further cause the projector 24 to project an image displayed below the tool 22 arranged on the display unit 200 (an image of an overlapping region of the window 322 and the tool 22 in the example illustrated in FIG. 14) onto the surface of the tool 22. According to this configuration, it is possible to implement an effect of causing the user to perceive the tool 22 as if the tool 22 were transparent. Particularly, for example, when a color of the surface of the tool 22 is a white-based color, a projected image looks more beautiful, and thus it is possible to cause the user to perceive the tool 22 as if it were more transparent.

Figure 15:
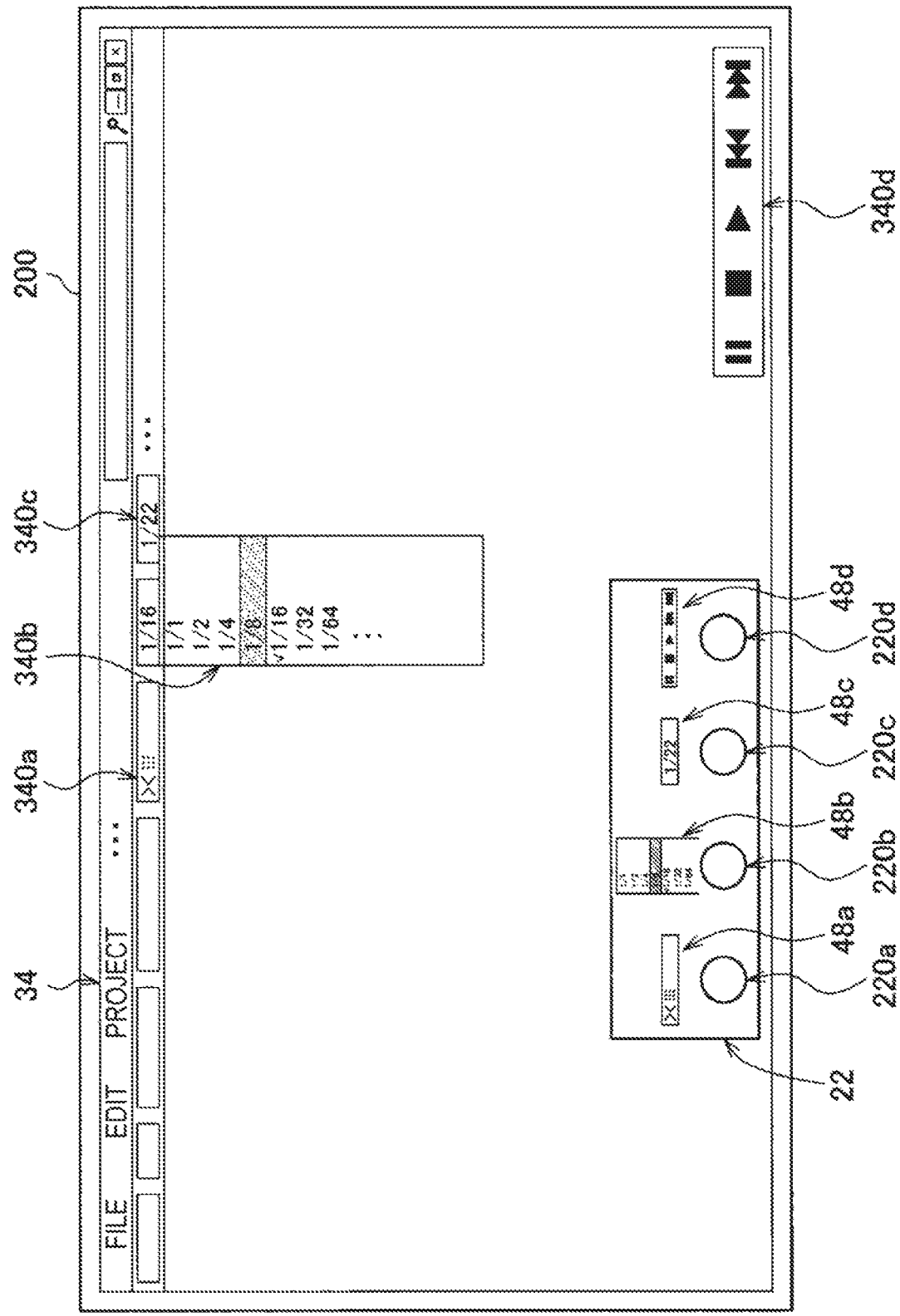
FIG. 15 is an explanatory diagram illustrating a display example of a display indicating a correspondence relation between the GUI and the tool 22 according to the embodiment.

FIG. 15 is an explanatory diagram illustrating an example in which another application screen (application screen 34) is displayed on the display unit 200. As illustrated in FIG. 15, the application screen 34 includes a plurality of GUIs 340 such a toolbar and a drop-down menu.

Further, as illustrated in FIG. 15, the tool 22 is assumed to be arranged at an arbitrary position on the display unit 200 by the user. Further, in FIG. 15, the respective operation systems 220 included in the tool 22 are assumed to be associated with the respective GUIs 340 displayed on the application screen 34 through the associating unit 102.

As illustrated in FIG. 15, the tool display control unit 106 causes the projector 24 to project an image 48b of a drop-down menu 340b associated with the operation system 220b onto the surface of the operation system 220b. Here, for example, the image 48b may be an image obtained by cutting an image region of a predetermined number of selection candidates including a selection candidate on which a cursor is currently positioned ("1/8" in the example illustrated in FIG. 15) among a plurality of selection candidates displayed in the drop-down menu 340b as illustrated in FIG. 15.

Further, for example, when an operation of pushing the stick 222 included in the operation system 220b in the front-back direction, an operation of rotating the dial portion 226, or the like is detected, the tool display control unit 106 can move the position of the cursor in the drop-down menu 340b and cause the projector 24 to project the image 48b after the movement of the cursor onto the surface of the operation system 220b. For example, when the decision operation such as an operation of pressing the stick 222 or the dial portion 226 included in the operation system 220b is detected after the projection, the server 10 can determine that the selection candidate on which the cursor is currently positioned among the plurality of selection candidates displayed in the drop-down menu 340b has been selected by the user.

Modified Example

As a modified example, for example, in the case in which a toolbar is associated with the operation system 220 and the operation system 220 is not operated by the user, when the operation of the user on the operation system 220 is newly detected, the tool display control unit 106 causes the projector 24 to project all or some of images newly displayed on the application screen 34 when the toolbar associated with the operation system 220 is selected onto the surface of the corresponding operation system 220. For example, in the example illustrated in FIG. 15, when the operation of the user on the dial portion 226 included in the operation system 220a is detected, the tool display control unit 106 may cause the projector 24 to project an image newly displayed on the application screen 34 when a toolbar 340a associated with the operation system 220a is selected onto the surface of the operation system 220a (instead of an image 48a).

Further, in this modified example, the screen display control unit 108 to be described later can cause the application screen 34 to simultaneously display images newly displayed when the toolbar is selected.

[2-1-4. Screen Display Control Unit 108]

(2-1-4-1. Screen Display Example 1)

The screen display control unit 108 is an example of the display control unit according to the present disclosure. For example, the screen display control unit 108 causes the display unit 200 to display a display screen including one or more GUIs such as the application screen 30 illustrated in FIG. 2.

(2-1-4-2. Screen Display Example 2)

Further, when the GUI displayed on the display screen is associated with the tool 22 through the associating unit 102, the screen display control unit 108 is able to cause a display indicating the correspondence relation between the GUI and the tool 22 to be displayed at a position related to the GUI in the display screen.

For example, in this case, the screen display control unit 108 causes the display unit 200 to display a line 44 of a predetermined color around the GUI associated with the tool 22 as illustrated in FIG. 13. More specifically, for example, each time the individual operation system 220 included in the tool 22 is associated with the GUI, the screen display control unit 108 causes the display unit 200 to display a line 44 of a color different from a color of a line 44 of an already associated GUI around the GUI newly associated with the display unit 200.

Modified Example

As a modified example, when the tool 22 is arranged on the display unit 200 and the GUI displayed on the application screen 30 is associated with the tool 22 through the associating unit 102, the screen display control unit 108 may cause the display unit 200 to emit light for a region near the arrangement region of the tool 22 in the display unit 200 in the same color as the color of the line displayed around the GUI associated with the tool 22.

(2-1-4-3. Screen Display Example 3)

Further, when the GUI and the tool 22 are associated through the associating unit 102, the screen display control unit 108 is able to change the image of the GUI displayed on the display screen on the basis of the form of an operation performed by the user on the tool 22.

For example, in the example illustrated in FIG. 12, when it is detected that the user rotates the operation system 220*b* associated with the dial 3040*b* at a high speed and then separates his/her hand from the operation system 220*b*, the screen display control unit 108 may display the image of the dial 3040*b* so that the dial 3040*b* continues to rotate with inertia in the display screen.

Further, in the example illustrated in FIG. 15, when the operation system 220*b* associated with the drop-down menu 340*b* includes a stick 222, similarly to the tool 22-1*a* illustrated in FIG. 3, and a predetermined operation performed on the stick 222 of the operation system 220*b* is detected, the screen display control unit 108 may move the position of the cursor in the drop-down menu 340*b* faster and display it. Examples of the predetermined operation performed on the stick 222 include an operation of pressing the stick 222 downward more deeply and an operation of pushing the stick 222 forward or backward with strong force. According to this configuration, the operation efficiency for the user is expected to be enhanced.

(2-1-4-4. Screen Display Example 4)

As a modified example, in the case in which the display device 20 is a monitor for a desktop PC, for example, when the tool 22 to be operated is detected to be placed on a desk by the user, the screen display control unit 108 is able to display the image of the tool 22 at a predetermined position on the display screen. As a method of detecting the tool 22 being placed on the desk, for example, a detection method using a touch sensor installed on the back side of the tool 22 may be used.

[2-1-5. Function Control Unit 110]

The function control unit 110 controls the function corresponding to the GUI associated with the tool 22 on the basis of the operation performed by the user on the tool 22. For example, the function control unit 110 adjusts the value of the parameter related to the GUI associated with the tool 22 on the basis of the operation performed by the user on the tool 22. For example, in the example illustrated in FIG. 14, when the user rotates the dial portion 226 of the operation system 220*b* clockwise, the value of the parameter (for example, "volume") related to the function of the dial 320*b* labeled "VOLUME" associated with the operation system 220*b* is increased.

[2-1-6. Tool Control Unit 112]

For example, the tool control unit 112 controls the operation of the tool 22 with which the server 10 can communicate. For example, when the user operates the tool 22, the tool control unit 112 operates the tool 22 so that physical feedback is given to the user at a predetermined timing. As an example, for example, when the GUI of the clock is associated with the tool 22, and the user rotates the tool 22, the tool control unit 112 operates the tool 22 so that a feeling of clicking lightly is given to the user when a time indicated by the GUI of the clock reaches "12 o'clock." Alternatively, when the user rotates the tool 22 associated with a certain GUI, and the value of the parameter related to the function of the GUI reaches a maximum value or a minimum value, the tool 22 may be operated so that a feeling of the rotation becoming heavy is given to the user, or the rotation may be stopped. According to this configuration, the user can perform a desired operation substantially without watching the GUI in the display screen.

Alternatively, the tool control unit 112 may change a weight at the time of the rotation operation of the tool 22 in accordance with a type of GUI associated with the tool 22. Accordingly, it is possible to give the user a texture similar to a real dial at the time of the rotation operation of the tool 22.

Alternatively, when the user rotates the tool 22, the tool control unit 112 may operate the tool 22 so that a click feeling is given to the user each time the value of the parameter related to the GUI function associated with the tool 22 reaches, for example, a predetermined value. According to this configuration, it is possible to synchronize a change in the value with the click feeling given to the user.

Alternatively, the tool control unit 112 may vibrate the tool 22, for example, each time a selected button among a plurality of buttons included in the ribbon is switched or each time the position of the cursor in the drop-down menu is moved. Alternatively, the tool control unit 112 may vibrate the tool 22 when a decision operation using the tool 22 by the user is detected. According to these configurations, when the tool 22 associated with the GUI is operated, the user can perform a desired operation without needing to look at the GUI too many times. Therefore, the operation efficiency can be expected to be improved.

[2-1-7. Marker Detecting Unit 114]

For example, when the tool 22 includes the invisible marker 224, the marker detecting unit 114 recognizes the invisible marker 224 from the tool 22 on the basis of a projection image of the tool 22 captured by an infrared camera.

Further, the marker detecting unit 114 recognizes the operation content of the user on the basis of a result of detecting motion of the invisible marker 224. For example, when it is detected that the invisible marker 224 is rotating, the marker detecting unit 114 recognizes that the user is performing the rotation operation on the tool 22.

[2-1-8. Warning Unit 116]

The warning unit 116 gives a notification indicating a warning to the user when the operation performed by the user on the tool 22 is detected, and the invisible marker 224 is not detected by the marker detecting unit 114. For example, in this case, the warning unit 116 causes the display unit 200 to display an error indication notifying of an operation error of the tool 22 (a detection error of the invisible marker) or causes the projector 24 to project the error indication. As an example, the warning unit 116 causes the projector 24 to project the error indication near the tool 22 including a corresponding invisible marker 224.

Alternatively, in this case, the warning unit 116 may vibrate the tool 22 with a predetermined vibration pattern or may output a buzzer to a speaker (not illustrated) capable of communicating with the server 10.

As a method of detecting that the user is operating the tool 22, for example, a method in which the tool 22 detects that the hand of the user is touching the tool 22 may be used.

[2-1-9. Data Management Unit 118]

The data management unit 118 associates mapping information indicating a result of association by the associating unit with the application screen displayed on the display unit 200 and stores the resulting mapping information in a mapping information DB 124 to be described later. Here, for example, the mapping information is information indicating the correspondence relation between the individual operation system 220 included in the tool 22 and the GUI included in the application screen.

According to this configuration, when the same application screen is displayed again after the display is switched from a currently displayed application screen to another screen, the user can omit re-execution of the same mapping operation. Further, the operation efficiency is improved.

(2-1-9-1. Mapping Information DB 124)

The mapping information DB 124 is a database in which the mapping information and the application screen displayed at the time of generation of the mapping information are registered in association with each other. A user ID, an operation date and time, and the like may be further registered in association in the mapping information DB 124.

[2-1-10. Communication Unit 120]

The communication unit 120 performs transmission and reception of information with other devices capable of communicating with the server 10. For example, the communication unit 120 transmits screen information of the application screen to the display device 20 under control of the screen display control unit 108. The communication unit 120 transmits image information indicating the correspondence relation between the GUI and the tool 22 to the projector 24 in accordance with the control of the tool display control unit 106. Further, the communication unit 120 receives a result of detecting the operation performed by the user on the tool 22 from the tool 22.

[2-1-11. Storage Unit 122]

For example, the storage unit 122 can store various kinds of data such as the mapping information DB 124 and software.

A configuration of the server 10 according to the present embodiment is not limited to the configuration described above. For example, the mapping information DB 124 may be stored in another device (not illustrated) capable of communicating with the server 10 instead of the storage unit 122.

<2-2. Operation>

The configuration according to the present embodiment has been described above. Next, an operation according to the present embodiment will be described with reference to FIG. 16. Here, the above-described decision mechanism is assumed to be included in the tool 22. Further, an operation example in a situation in which the GUI is not mapped to the tool 22 will be described.

Figure 16:
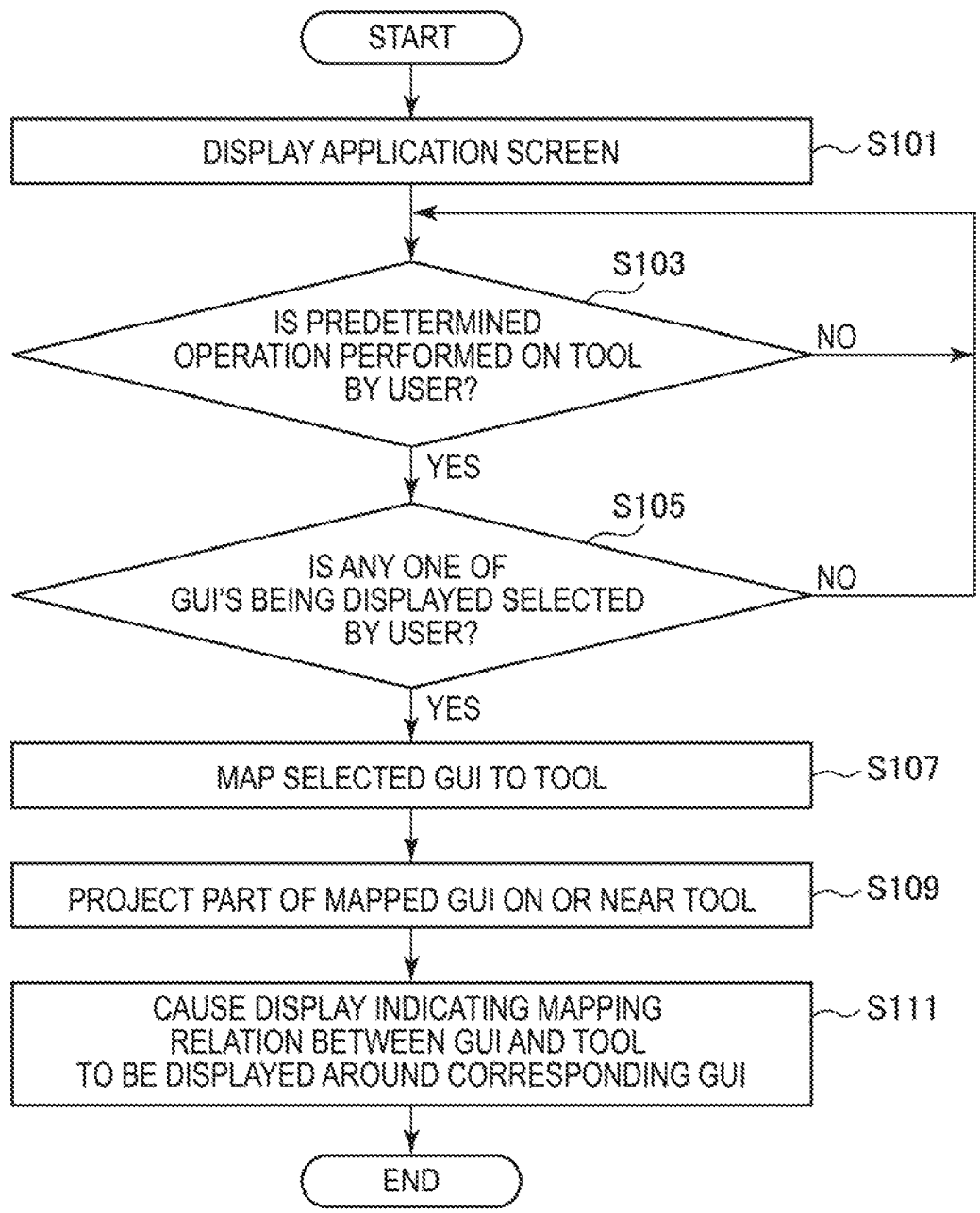
FIG. 16 is a flowchart illustrating an operation according to the embodiment.

FIG. 16 is a flowchart illustrating an operation according to the present embodiment. As illustrated in FIG. 16, the screen display control unit 108 of the server 10 causes the display unit 200 to display the application screen (S101).

Thereafter, the associating unit 102 is on standby until a detection result indicating that the decision mechanism of the tool 22 is operated by the user is received from the tool 22 (S103). When the decision mechanism of the tool 22 is operated by the user (Yes in S103), the associating unit 102 determines that the tool 22 enters a mapping setting state. Then, the associating unit 102 determines whether or not any one of GUIs displayed on the application screen is selected by touch of the user, clicking of a mouse, or the like while the decision mechanism of the tool 22 is being operated by the user (S105). When the operation performed by the user on the decision mechanism of the tool 22 is suspended with no selection of the GUI (No in S105), the server 10 releases the mapping setting state of the tool 22 and performs the operation of S103 again.

On the other hand, when any one of the displayed GUIs is selected by the user within a predetermined time (Yes in S105), the associating unit 102 maps the selected GUI to the tool 22 (S107).

Then, the tool display control unit 106 causes the projector 24 to project a part of a GUI image mapped in S107 to be projected on the surface of the tool 22 or near the tool 22 (S109).

Thereafter, the screen display control unit 108 causes the display unit 200 to display, for example, a line of a predetermined color indicating a mapping relation between the GUI and the tool 22 which are mapped in S107 around the corresponding GUI in the application screen (S111).

[2-2-1. Modified Example]

As a modified example of the above-described operation, for example, when a certain GUI is mapped to the tool 22 in advance and the user presses the stick 222 of the tool 22 for a long time, the associating unit 102 may transition to a mode of performing mapping of the tool 22 again (that is, the mapping setting state). Further, when the GUI is mapped to the tool 22 in advance and the user presses the stick 222 for a short time, the server 10 recognize that the decision operation for the GUI currently mapped to the tool 22 is performed by the user.

While the tool 22 is in the mapping setting state, the tool display control unit 106 may cause the projector 24 to perform irradiation so that the stick 222 of the tool 22 (or the entire tool 22) blinks or cause the tool 22 to emit light. According to this display example, the user can easily understand whether or not the tool 22 is in the mapping setting state.

<2-3. Effects>

[2-3-1. First Effect]

As described above with reference to FIGS. 9, 16, and the like, according to the present embodiment, the user can associate a desired GUI among a plurality of GUIs arranged in various positions in the application screen with (the individual operation system 220 included in) one tool 22 by a simple operation.

[2-3-2. Second Effect]

Further, when each of a plurality of GUIs is associated with the individual operation system 220 included in one tool 22, the user can operate a plurality of GUIs collectively by hand. Therefore, compared to the operation using the touch operation or the mouse, for example, it is possible to reduce the moving distance of the hand of the user for operating the GUI, and it is possible to reduce the user's time and effort. Further, since a plurality of GUI functions can be operated simultaneously through one tool 22, the operation efficiency can be improved.

[2-3-3. Third Effect]

Further, when each of a plurality of GUIs is associated with one of the operation systems 220 included in the tool 22, the server 10 causes the display indicating the correspondence relation between the GUI and the operation system 220 to be projected onto the surface of the operation system 220 or near the operation system 220 for each operation system 220 or causes the operation system to display the display indicating the correspondence relation. Therefore, the user can understand the operation system 220 and the GUI which are associated with each other at a glance.

Further, for example, since images of a plurality of GUIs associated with one tool 22 can be displayed on the tool 22 or in the vicinity of the tool 22, it is also possible to reduce the moving distance of the line of sight of the user for operating the GUI.

[2-3-4. Fourth Effect]

Further, the task is shared by the left and right hands depending on the operation content, and thus it is possible to further improve the operation efficiency. For example, the user can simultaneously perform the touch operation by hand or the operation using the mouse or the stylus by right hand while leaving his/her left hand on the tool 22 and operating the tool 22.

<<3. Application Example>>

The present embodiment has been described above. Next, an application example of the present embodiment will be described. A configuration of the information processing system according to an application example of the present embodiment is substantially similar to that of the present embodiment illustrated in FIG. 1.

<3-1. Configuration>

First, a configuration of the server 10 according to the present application example will be described. Further, components included in the server 10 according to the present application example are the same as those of the present embodiment. The following description will proceed only with components having different functions from those described above.

[3-1-1. Associating Unit 102]

(3-1-1-1. Association)

The associating unit 102 according to the present application example automatically associates the GUI displayed in the display region in which the tool 22 is arranged with the tool 22 when the user arranges the tool 22 on the display unit 200.

Figure 17:
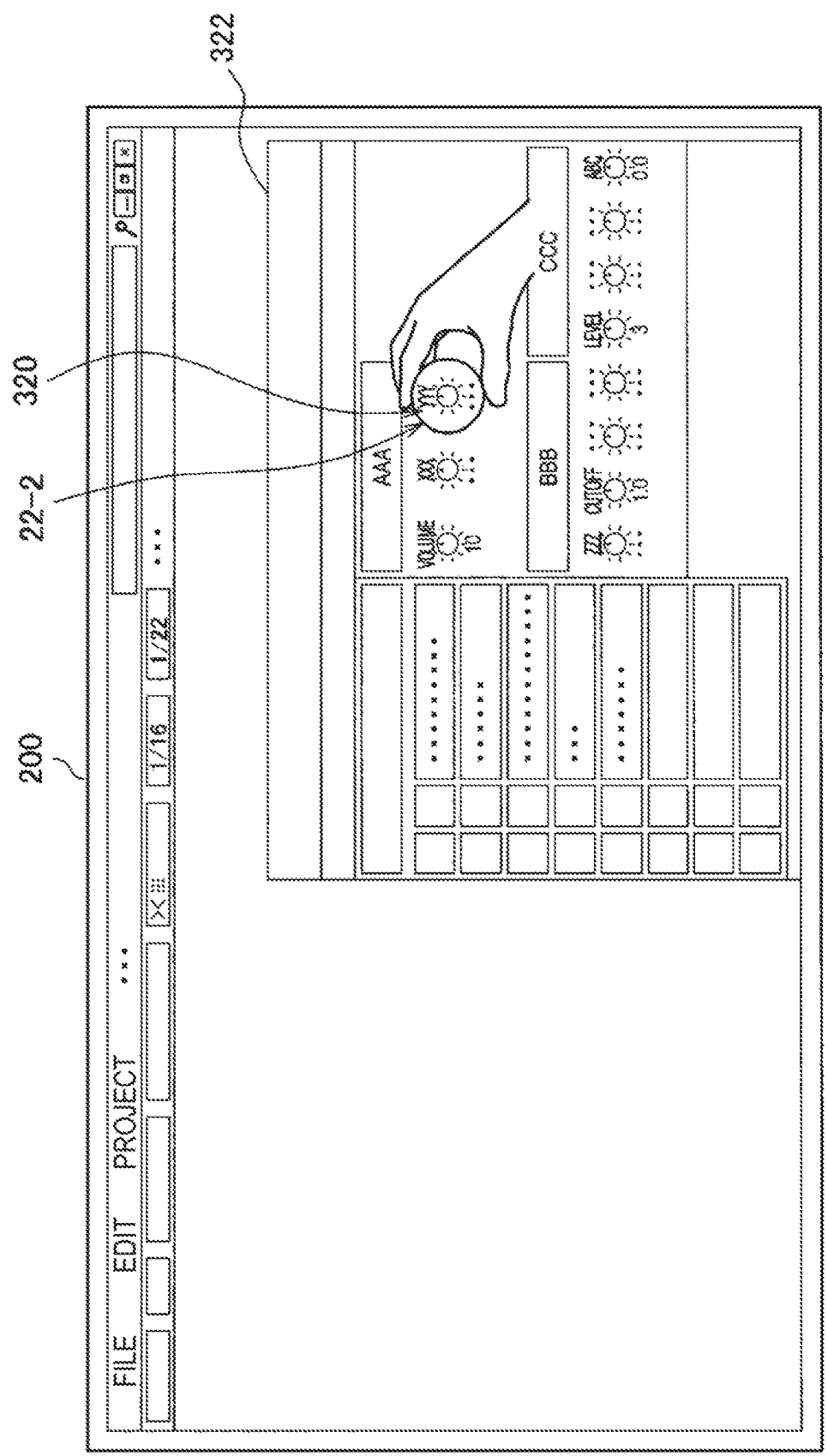
FIG. 17 is an explanatory diagram illustrating an operation example at the time of association of a GUI and a tool 22 according to an exemplary application of the embodiment.

Here, the above function will be described in further detail with reference to FIG. 17. FIG. 17 is an explanatory diagram illustrating a situation in which the user arranges the tool 22-2 on the display region of the GUI displayed on the display unit 200. As illustrated in FIG. 17, when the user arranges the tool 22-2 on the display region of the dial 320 (labeled "YYY") in the display unit 200, the associating unit 102 associates the dial 320 with the tool 22-2.

A type of tool 22 used in the present application example is basically the tool 22-2, that is, the tool 22 having the invisible marker 224. Further, in the present application example, the tool 22-2 having only one operation system 220 such as the tool 22-2a illustrated in FIG. 5 is basically used.

(3-1-1-2. Release of Association)

Further, after the GUI has been associated with the tool 22, the associating unit 102 automatically releases the association between the GUI and the tool 22 when the user removes the tool 22 from the display unit 200.

Modified Example

As a modified example, even when the tool 22 is removed from the display unit 200, it is also possible to maintain the association between the GUI and the tool 22. For example, the associating unit 102 may maintain the association between the GUI and the tool 22 until a predetermined time elapses after the tool 22 is removed from the display unit 200.

[3-1-2. Tool Display Control Unit 106]

When the GUI is associated with the tool 22 through the associating unit 102, the tool display control unit 106 according to the present application example causes the image of the GUI associated with the tool 22 to be displayed on the surface of the tool 22. For example, in this case, the tool display control unit 106 causes the projector 24 to project the image of the GUI onto the surface of the tool 22 or causes (the display included in) the tool 22 to display the image.

Figure 18:
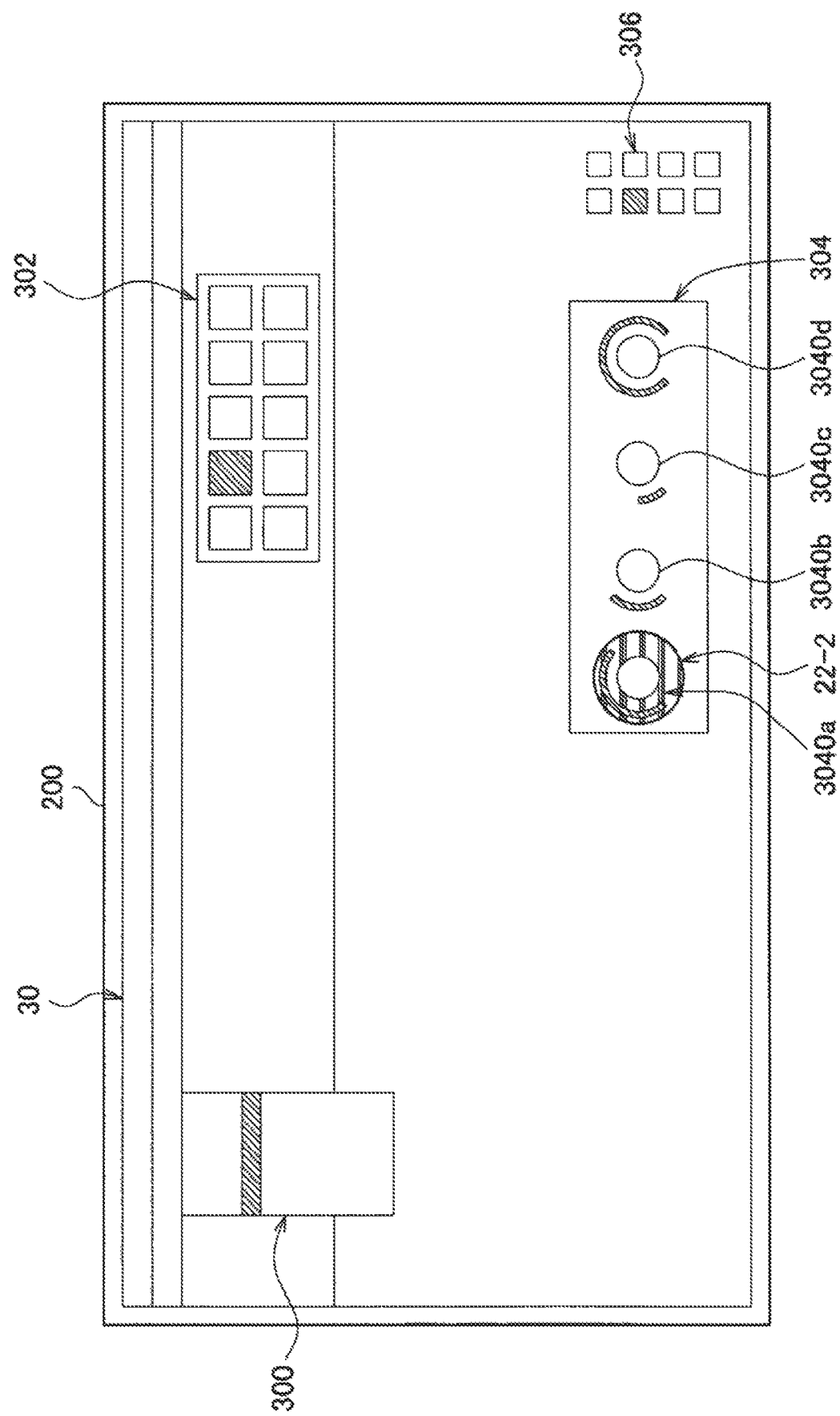
FIG. 18 is an explanatory diagram illustrating a display example of a display indicating a correspondence relation between the GUI and the tool 22 according to the same application example.

Here, the above function will be described in further detail with reference to FIG. 18. FIG. 18 is an explanatory diagram illustrating an example of projection in the case in which the application screen 30 illustrated in FIG. 2 is displayed on the display unit 200 and the tool 22-2 is arranged on the display unit 200 by the user. In FIG. 18, the tool 22 is assumed to be arranged on the display region of the dial 3040a in the display unit 200, and the dial 3040a and the tool 22 are assumed to be associated by the associating unit 102.

As illustrated in FIG. 18, the tool display control unit 106 causes the projector 24 to project the image of the dial 3040a onto the surface of the tool 22-2. According to this projection example, since the user attempts to operate the tool 22-2 while looking at the image of the GUI projected on the surface of the tool 22-2, the tool 22-2 is operated so that the surface of the tool 22-2 is not covered with the hand. Therefore, it is possible to indirectly prevent the invisible marker 22-2 from being covered with the hand of the user, and it is possible to greatly reduce situations in which the invisible marker 22-2 is unreadable.

As a modified example, for example, when it is detected that the user pinches the surface of the tool 22 and taps it with his/her finger after the image of the GUI is projected onto the surface of the tool 22, the tool display control unit 106 is also able to enlarge or reduce the image of the GUI associated with the tool 22 and cause the image of the GUI to be projected onto the surface of the tool 22 or cause the tool 22 to display the image of the GUI.

[3-1-3. Screen Display Control Unit 108]

(3-1-3-1. Screen Display Example 1)

When the GUI is associated with the tool 22 through the associating unit 102, the screen display control unit 108 according to the present application example causes a region around the arrangement region of the tool 22 in the display unit 200 to be displayed brighter by causing the display unit 200 to emit light.

Figure 19:
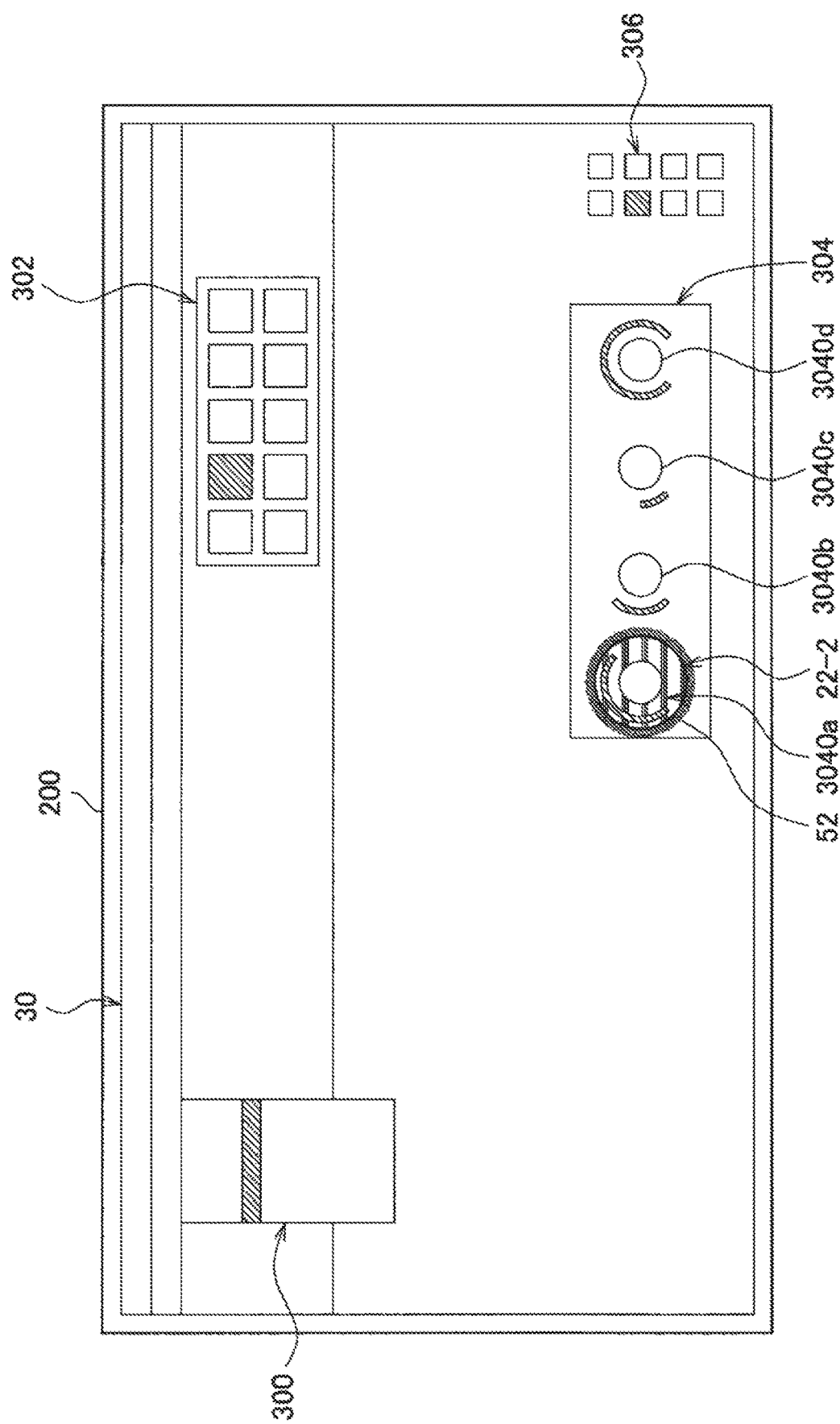
FIG. 19 is an explanatory diagram illustrating a light emission example of the tool 22 associated with the GUI according to the same application example.

Here, the above function will be described in further detail with reference to FIG. 19. FIG. 19 illustrates a state in which the tool 22-2 is arranged on the display region of the dial 3040a in the display unit 200, similarly to FIG. 18.

Similarly to light emission 52 illustrated in FIG. 19, the screen display control unit 108 performs display brightly, for example, by causing light to be emitted in a region around the arrangement region of the tool 22-2 in the display unit 200. According to this configuration, the user can recognize that the association between the GUI and the tool 22-2 is completed. Therefore, the user need not operate the tool 22-2 in order to check whether or not the association is completed.

(3-1-3-2. Screen Display Example 2)

As a modified example, after the GUI is associated with the tool 22 through the associating unit 102, when the user translates the tool 22 on the display unit 200, the screen display control unit 108 is also able to cause a display position of a window including the GUI associated with the tool 22 to be moved along with the movement of the tool 22.

For example, in an example illustrated in FIG. 17, after the tool 22-2 is associated with the dial 320, when the user translates the tool 22-2 in the left direction in FIG. 17 on the display unit 200, the screen display control unit 108 causes the display position of the window 322 to be moved and displayed in the same movement direction as the tool 22-2 by the same movement distance, following the movement of the tool 22-2.

According to this configuration, the user can move the window including the GUI associated with the tool 22 to be close to the user, for example, by translating the tool 22 to be close to him/her on the display unit 200. Thus, since the user can operate the GUI by hand and view the window including the GUI, the operation is easy.

Further, functions of the other components are similar to those in the present embodiment.

<3-2. Operation>

The configuration according to the present application example has been described above. Next, an operation according to the present application example will be described with reference to FIG. 20. Here, the tool 22-2 is assumed to be used as a type of tool 22.

Figure 20:
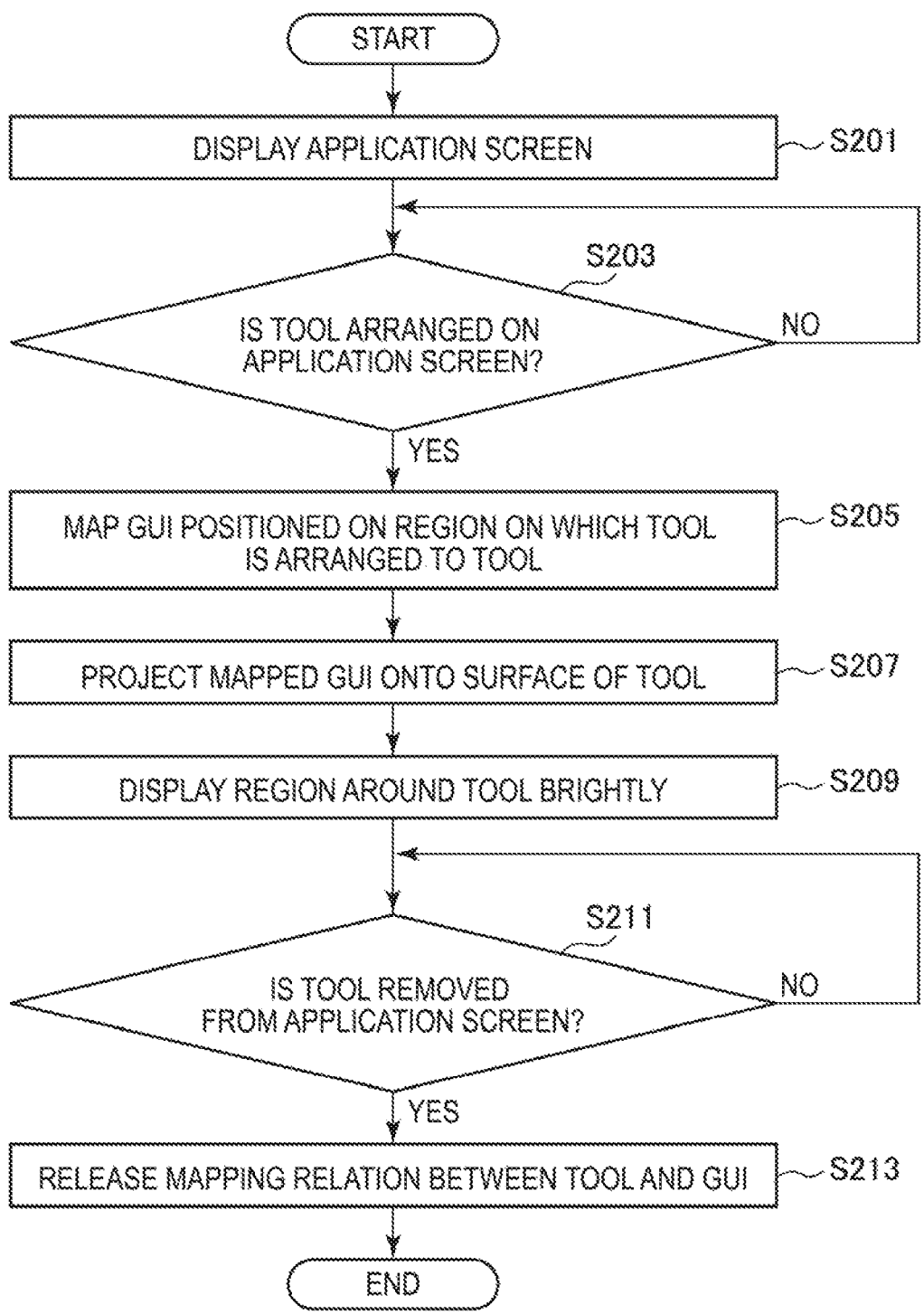
FIG. 20 is a flowchart illustrating an operation according to the same application example.

An operation of S201 illustrated in FIG. 20 is similar to S101 according to the present embodiment.

After S201, the associating unit 102 is on standby until a result of detecting that the tool 22-2 is arranged on the display unit 200 is received from, for example, the display device 20 (S203).

Then, when the tool 22-2 is arranged on the display unit 200 (Yes in S203), the associating unit 102 maps the GUI displayed on the display region on which the tool 22-2 is arranged to the tool 22-2 (S205).

Then, the tool display control unit 106 causes the projector 24 to project the image of the GUI mapped in 5205 onto the surface of the tool 22-2 (S207).

Then, the screen display control unit 108 causes light to be emitted in a region around the arrangement region of the tool 22 in the display unit 200 (S209).

Thereafter, the associating unit 102 is on standby until the tool 22-2 is removed from the display unit 200 (S211).

Then, when the tool 22-2 is removed from the display unit 200 (Yes in S211), the associating unit 102 releases the association between the corresponding GUI and the tool 22 (S213).

<3-3. Effects>

[3-3-1. First Effect]

As described above with reference to FIG. 20 and the like, for example, the server 10 according to the present application example automatically associates the GUI displayed on the display region in which the tool 22 is arranged with the tool 22 when the user arranges the tool 22 on the display unit 200. Then, the server 10 causes the image of the GUI associated with the tool 22 to be projected on the surface of the tool 22 or causes the tool 22 to display the image of the GUI.

Therefore, the user can operate the GUI more intuitively and efficiently while looking at the GUI displayed on the surface of the tool 22.

[3-3-2. Second Effect]

Further, according to the present application example, the user arranges the tool 22 by himself/herself on the application screen and operates the tool 22. For this reason, for example, other users can understand which user has performed the operation and the intention of the user at a glance in a situation in which a plurality of users simultaneously perform operations on the application screen. Therefore, the operation efficiency can be expected to be improved when a plurality of users perform operations.

<3-4. Application Example>

Next, an application example of the present application example will be described with reference to FIGS. 21 to 22. In the following description, content already described above is omitted.

Figure 21:
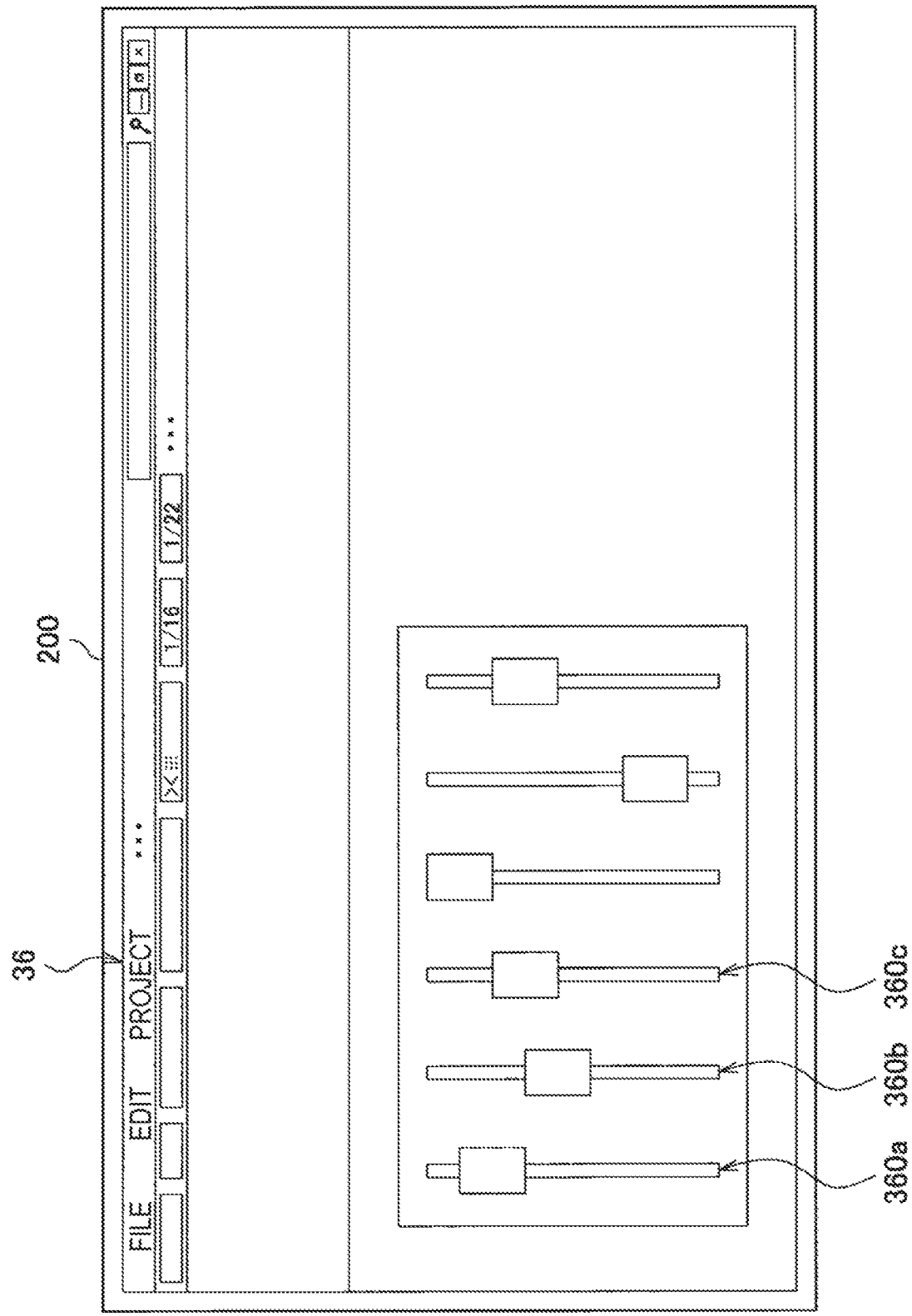
FIG. 21 is an explanatory diagram illustrating a display example of an application screen according to the exemplary application of the same application example.

FIG. 21 is an explanatory diagram illustrating a display example of the application screen (application screen 36) according to the present application example. As illustrated in FIG. 21, the application screen 36 includes a plurality of slider GUIs 360. The slider GUI 360 is a GUI capable of increasing or decreasing a value of a parameter of a function corresponding to the slider GUI 360, for example, when the user moves a knob included in the slider GUI 360 in a vertical direction.

[3-4-1. Associating Unit 102]

Figure 22:
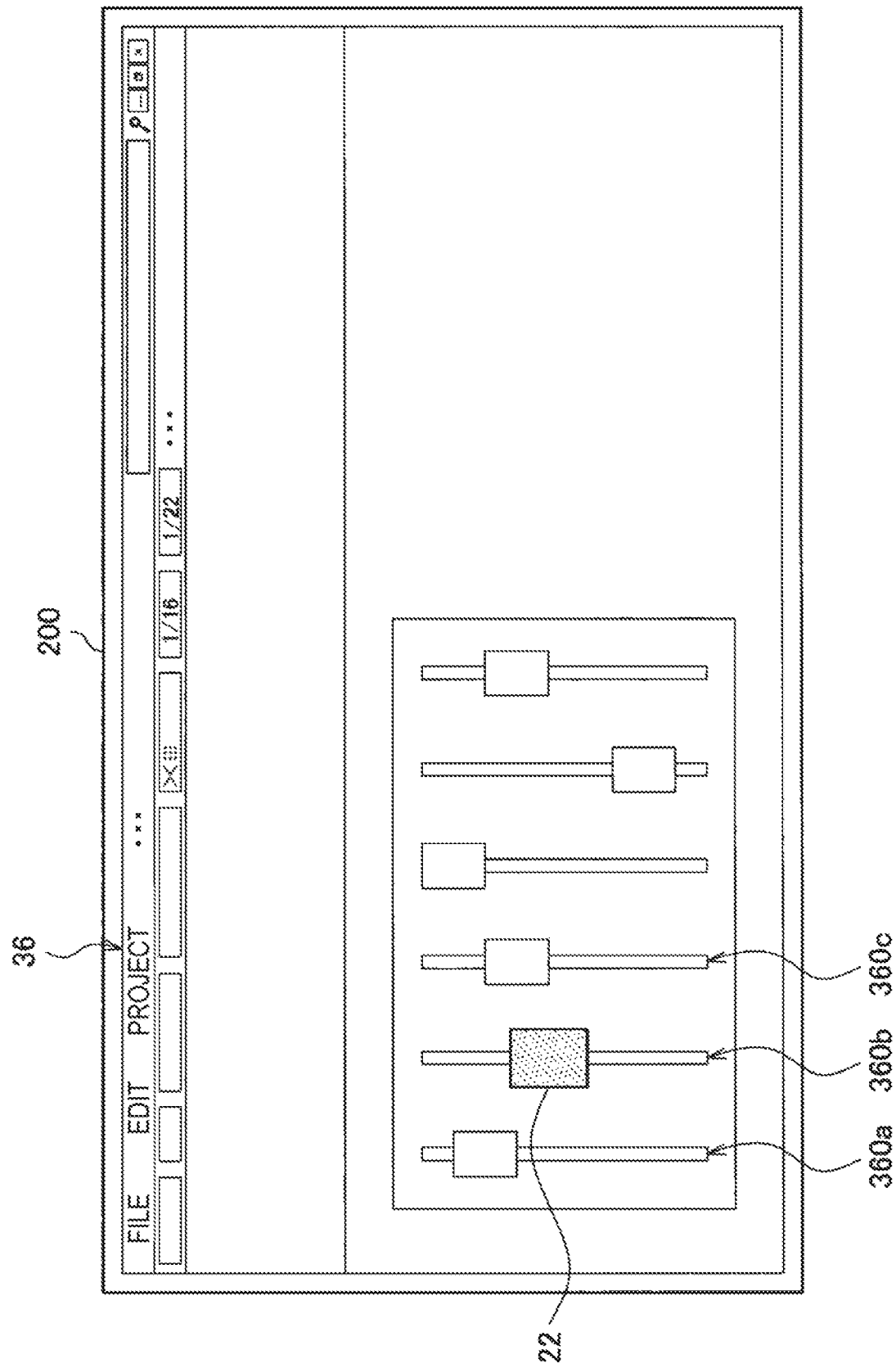
FIG. 22 is an explanatory diagram illustrating an example of association between the GUI and the tool 22 according to the same application example.

For example, as illustrated in FIG. 22, the associating unit 102 according to the present application example associates the slider GUI 360 displayed in the region on which the tool 22 is arranged with the tool 22 when the user arranges the tool 22 on a display region of the knob of the slider GUI 360 of the display unit 200.

According to this association, the user can move the knob of the slider GUI 360 by moving the tool 22 on the display unit 200. Therefore, the user can operate the slider GUI 360 more intuitively.

(3-4-1-1. Modified Example)

As a modified example, for example, it is possible to automatically set the slider GUI 360 which is not yet associated with the tool 22 among the slider GUIs 360 in the application screen 36 so that a mouse operation or a touch operation need not be received. According to this configuration, the user can operate the slider GUI 360 only using the tool 22 in principle, and thus the user can concentrate on the operation of the tool 22. Further, since the user operates only the tool 22 without using a plurality of operation methods, operation errors of the user can be expected to be reduced.

Further, a shape of the tool 22 employed in the present application example may be the same shape as or a similar shape to the knob of the slider GUI 360 as illustrated in FIG. 22. When such a shape is employed, the user can operate the slider GUI 360 on the display unit 200 with a sense of operating a real slider.

<<4. Hardware Configuration>>

Figure 23:
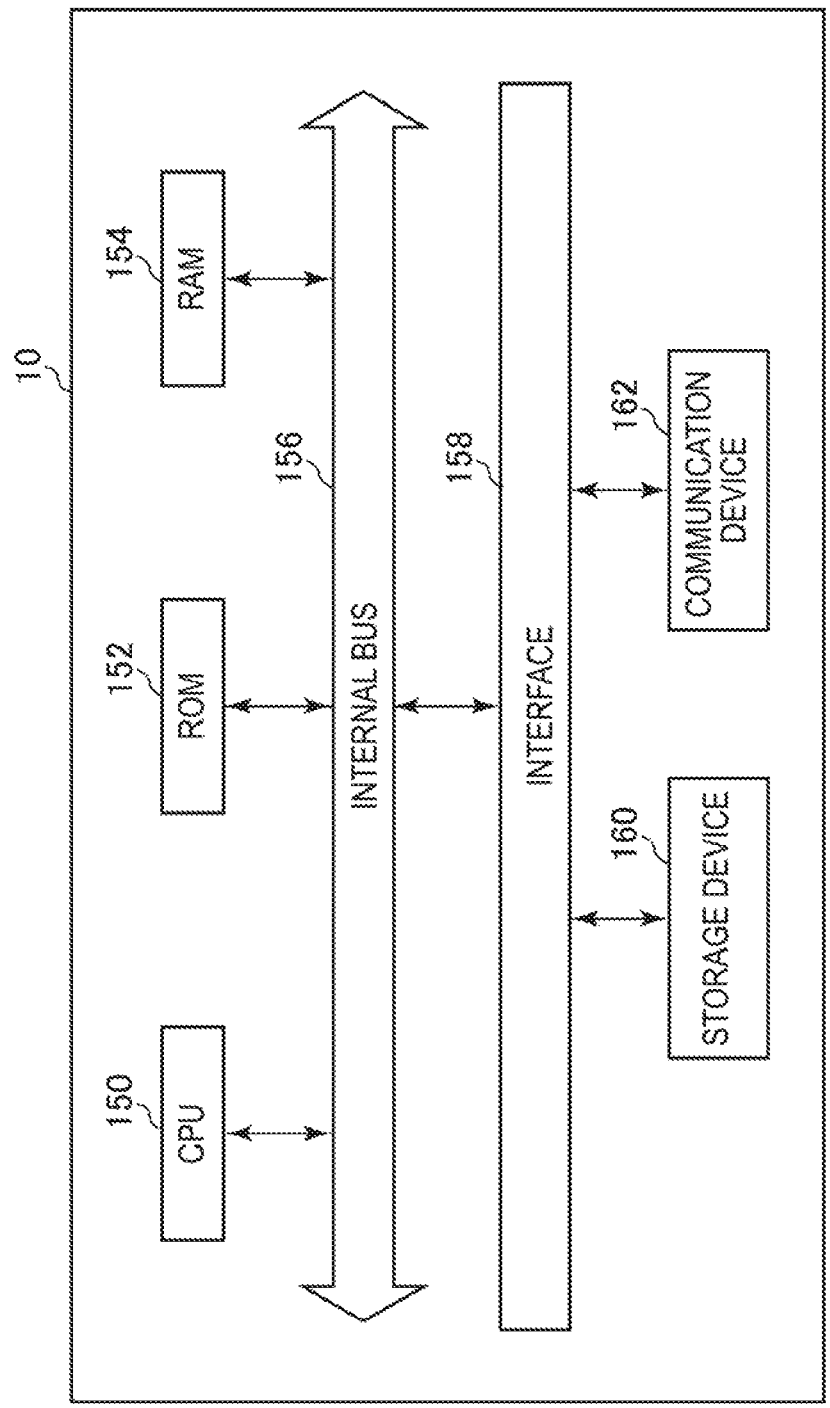
FIG. 23 is an explanatory diagram illustrating a hardware configuration of a server 10 according to the embodiment.

Next, a hardware configuration of the server 10 according to the present embodiment will be described with reference to FIG. 23. As illustrated in FIG. 23, the server 10 includes a CPU 150, a read only memory (ROM) 152, a RAM 154, an internal bus 156, an interface 158, a storage device 160, and a communication device 162.

<4-1. CPU 150>

The CPU 150 functions as an operation processing device and a control device and controls the operation of the server 10 in general in accordance with various kinds of programs.

Further, the CPU 150 implements the function of the control unit 100 in the server 10. The CPU 150 is configured with a processor such as a microprocessor.

<4-2. ROM 152>

The ROM 152 stores programs and control data such as operation parameters which are used by the CPU 150.

<4-3. RAM 154>

The RAM 154 temporarily stores, for example, programs executed by the CPU 150.

<4-4. Internal Bus 156>

The internal bus 156 is configured with a CPU bus or the like. The internal bus 156 connects the CPU 150, the ROM 152, and the RAM 154 with one another.

<4-5. Interface 158>

The interface 158 connects the storage device 160 and the communication device 162 to the internal bus 156. For example, the storage device 160 exchanges data with the CPU 150 via the interface 158 and the internal bus 156.

<4-6. Storage Device 160>

The storage device 160 is a data storage device functioning as the storage unit 122. Examples of the storage device 160 include a storage medium, a recording device that records data in a storage medium, a reading device that reads data from a storage medium, and a deleting device that deletes data recorded in a storage medium.

<4-7. Communication Device 162>

For example, the communication device 162 is a communication interface configured with a communication device that establishes a connection with a communication network such as a public network or the Internet. Further, the communication device 162 may be a wireless LAN support communication device, a Long Term Evolution (LTE) support communication device, or a wire communication device that performs wired communication. The communication device 162 functions as the communication unit 120.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

<5-1. First Modified Example>

For example, in the above-described embodiment, the example in which the GUI displayed on the application screen is associated with the tool 22 has been described, but the present disclosure is not limited to this example. As a first modified example, timbre assignment information may be associated with the keys of a musical keyboard.

Here, a background leading to creation of the first modified example will be described. In the past, a method of allocating timbre assignment information to the keys of a musical keyboard has been proposed. However, in the known technique, the allocated timbre assignment information is displayed at a position away from the keyboard, for example, on a predetermined monitor. For this reason, when a user plays the musical keyboard, it is difficult to check the timbre assignment information, and thus the operation efficiency is low.

As will be described later, according to the first modified example, the user can easily operate the keys while looking at the timbre assignment information associated with the keys.

[5-1-1. Configuration]

Figure 24:
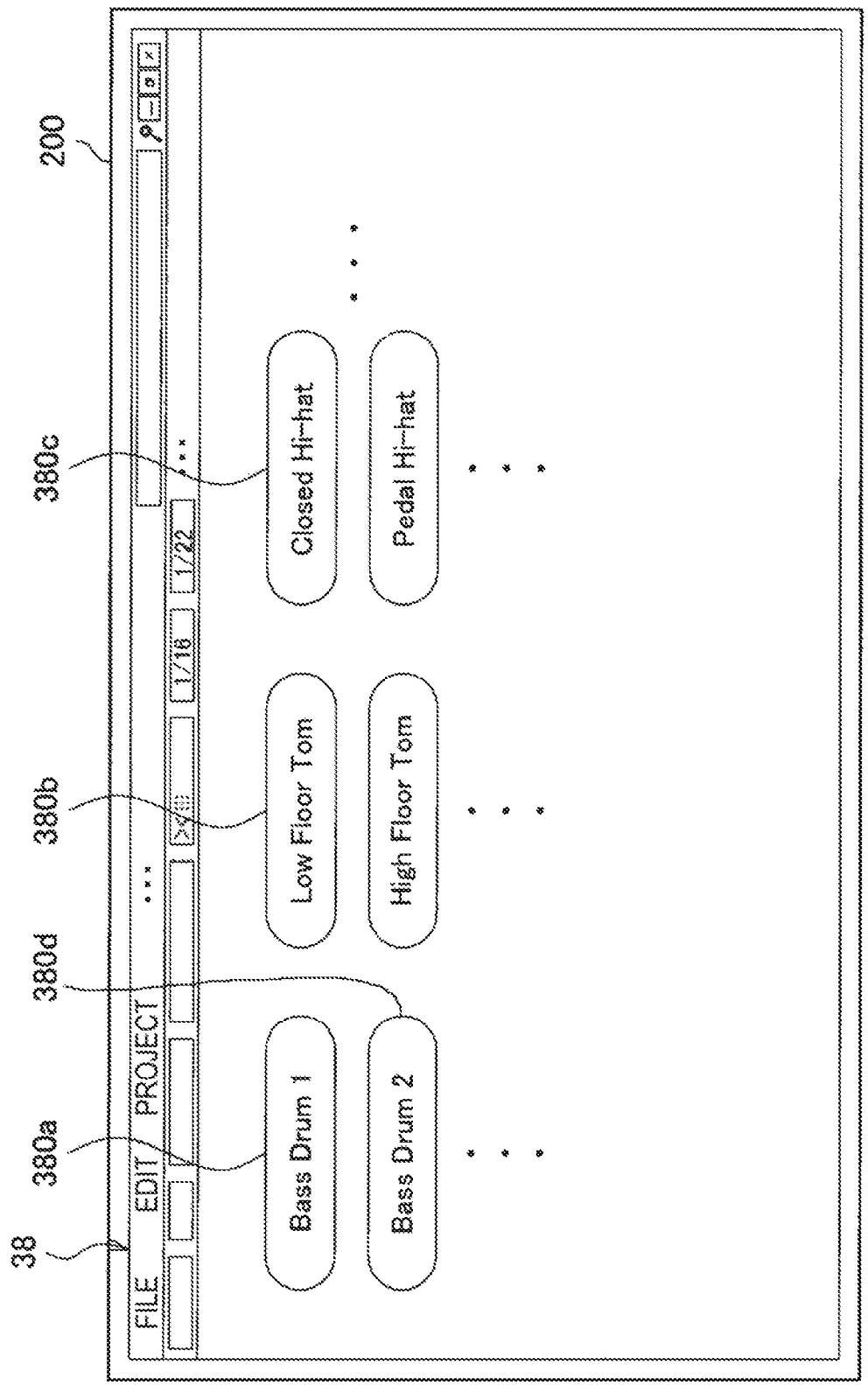
FIG. 24 is an explanatory diagram illustrating a display example of an application screen according to a first modified example of the present disclosure.
Figure 25:
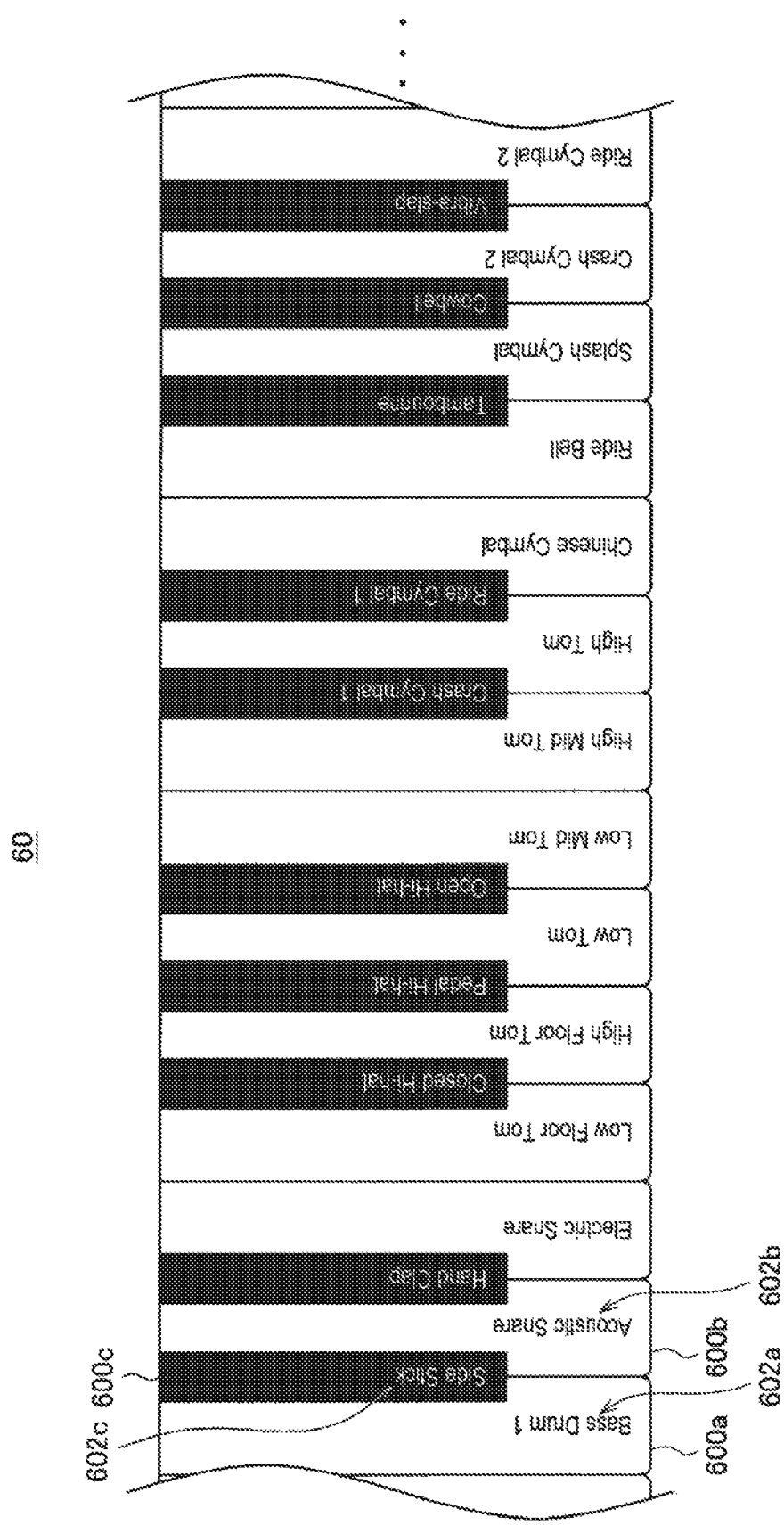
FIG. 25 is an explanatory diagram illustrating a projection example of timbre assignment information for the keys of a musical keyboard according to the first modified example.

Next, a configuration of the first modified example will be described with reference to FIGS. 24 and 25. FIG. 24 is an explanatory diagram illustrating a display example of the music assignment screen (music assignment screen 38) according to the first modified example. Further, FIG. 25 is an explanatory diagram illustrating an example of the musical keyboard (musical keyboard 60).

Further, components included in the server 10 according to the first modified example are similar to those of the present embodiment. Only with components having different functions from those described above will be described below.

(5-1-1-1. Associating Unit 102)

An associating unit 102 according to the first modified example associates a key being pressed by the user with timbre assignment information corresponding to a timbre selection button selected by the user, for example, when the user selects any one of a plurality of timbre selection buttons displayed on the music assignment screen while the user is pressing any one of the keys included in the musical keyboard.

For example, in the example illustrated in FIGS. 24 and 25, when the user selects a timbre selection button 380a in the music assignment screen 38 while the user is pressing a key 600a, the associating unit 102 associates the key 600a with the timbre assignment information (that is, "Bass Drum 1") corresponding to the timbre selection button 380a.

As a modified example, for example, the music assignment screen 38 may include a selection button 382 for selecting a set (combination) of a plurality of sound sources such as "drum set."

Further, for example, when the user selects the selection button 382 while the user is pressing the key 600a, for example, the associating unit 102 automatically associates a plurality of pieces of timbre assignment information corresponding to the selection button 382 (for example, "Bass Drum," "Snare Drum," "Open Hi-Hat," and "Closed Hi-Hat") with individual keys 600 in the musical keyboard 60.

Alternatively, even when the user selects only the selection button 382 in the music assignment screen 38 (that is, even when the keys 600 are not operated by the user at all), the associating unit 102 may automatically associate a plurality of pieces of timbre assignment information corresponding to the selection button 382 with the individual keys 600 in the musical keyboard 60.

(5-1-1-2. Tool Display Control Unit 106)

When the key is associated with the timbre assignment information through the associating unit 102, the tool display control unit 106 according to the first modified example causes the projector 24 to project the timbre assignment information associated with the key on the surface of the key or near the key. For example, as illustrated in FIG. 25, the tool display control unit 106 causes the projector 24 to project a character string such as "Bass Drum 1" which is the timbre assignment information associated with the key 600a onto the surface of the key 600a. Further, when the key 600 includes a display, the tool display control unit 106 may cause the key 600 to display the timbre assignment information associated with the key 600.

Further, the tool display control unit 106 can also cause the projector 24 to project a numerical value of performance information associated with the key 600 on the surface the key 600 or near the key 600.

[5-1-2. Effects]

As described above with reference to FIGS. 24 and 25, according to the first modified example, the user can easily associate the desired timbre assignment information with the key in the musical keyboard.

Further, the server 10 according to the first modified example causes the timbre assignment information associated with the key to be projected onto the surface of the key or near the key. Therefore, the user can operate the keys while looking at the associated timbre assignment information. Further, the operation efficiency can be improved.

Further, the user can easily check the performance information associated with the keys by looking at the keys. Further, the user can use the confirmed result as feedback in real-time performance.

<5-2. Second Modified Example>

Further, in the above embodiment, the example in which the information processing device according to the present disclosure is the server 10 has been described, but the present disclosure is not limited to this example. For example, the information processing device according to the present disclosure may be a mobile phone such as a PC, a smartphone, or a game machine.

Alternatively, the information processing device may be a device in which the above-described functions of the server 10 and the display device 20 are integrally configured. For example, when the display device 20 has all of the components included in the control unit 100, the information processing device may be the display device 20. In this modified example, the server 10 may not be provided.

<5-3. Third Modified Example>

According to the present embodiment, it is also possible to provide a computer program causing hardware such as the CPU 150, the ROM 152, and the RAM 154 to implement functions equivalent to the components of the server 10. A recording medium on which the computer program is recorded is also provided.

Additionally, the present technology may also be configured as below.

(1)

An information processing device, including:

a display control unit configured to perform first display control for causing an operation image to be displayed on a display screen and second display control for causing a first display indicating a correspondence relation between the operation image and an operating unit to be displayed at a position related with the operating unit.

(2)

The information processing device according to (1), in which the display control unit causes a projecting unit to project the first display to be displayed at the position related with the operating unit.

(3)

The information processing device according to (2), wherein the first display includes a parameter related to a function of the operation image associated with the operating unit.

(4)

The information processing device according to (3), further including a function control unit configured to adjust a value of the parameter related to the function of the operation image associated with the operating unit on the basis of an operation performed by a user on the operating unit.

(5)

The information processing device according to (4), wherein the display control unit causes the first display to be displayed in a form according to the value of an adjusted parameter each time the value of the parameter is adjusted by the function control unit.

(6)

The information processing device according to any one of (2) to (5), wherein the first display includes a part of the operation image associated with the operating unit.

(7)

The information processing device according to any one of (1) to (6), wherein the display control unit further causes a second display indicating a correspondence relation between the operation image and the operating unit to be displayed at a position related to the operation image in the display screen.

(8)

The information processing device according to any one of (1) to (7), wherein the position related to the operating unit is a surface of the operating unit.

(9)

The information processing device according to (8), wherein a marker is installed on the surface of the operating unit, and content of an operation performed by a user is recognized on the basis of a result of detecting motion of the marker.

(10)

The information processing device according to (9), further including:

a marker detecting unit configured to detect the marker from the operating unit; and a warning unit configured to give a notification indicating a warning to the user in the case where the operation performed by the user on the operating unit is detected and the marker is not detected.

(11)

The information processing device according to any one of (1) to (7), wherein the position related to the operating unit is a position near the operating unit.

(12)

The information processing device according to any one of (1) to (11), further including an associating unit configured to associate a selected operation image with the operating unit on the basis of a predetermined operation performed on the operating unit and selection by a user of an operation image displayed on the display screen.

(13)

The information processing device according to (12), wherein a plurality of types of operation images are displayed on the display screen, and the associating unit associates an operation image selected by a user among the plurality of types of operation images with the operating unit.

(14)

The information processing device according to any one of (1) to (11), further including an associating unit configured to associate an operation image displayed in a display region in which the operating unit is arranged with the operating unit in the case where a user arranges the operating unit on a display unit configured to display the display screen.

(15)

The information processing device according to (14), wherein the display control unit further causes a projecting unit to project an image displayed in the display region in which the operating unit is arranged in the display unit onto the operating unit.

(16)

The information processing device according to any one of (1) to (15),
wherein there are a plurality of the operating units, and the plurality of operating units have a combined shape.

(17)

The information processing device according to any one of (1) to (16),
wherein the operation image is an image for adjusting a function corresponding to the operation image.

(18)

The information processing device according to any one of (1) to (17), further including
a data management unit configured to store correspondence information indicating an association by the associating unit in a storage unit in association with the display screen.

(19)

An information processing method, including:
performing first display control for causing an operation image to be displayed on a display screen and second display control for causing a first display indicating a correspondence relation between the operation image and an operating unit to be displayed at a position related with the operating unit.

(20)

A program for causing a computer to function as:
a display control unit configured to perform first display control for causing an operation image to be displayed on a display screen and second display control for causing a first display indicating a correspondence relation between the operation image and an operating unit to be displayed at a position related with the operating unit.

REFERENCE SIGNS LIST 10 server
20 display device
22 simple tool
22 tool
24 projector
100 control unit
102 associating unit
104 display control unit
106 tool display control unit
108 screen display control unit
110 function control unit
112 tool control unit
114 marker detecting unit
116 warning unit
118 data management unit
120 communication unit
122 storage unit
124 mapping information DB
200 display unit
220 operation system

The invention claimed is:

1. An information processing device, comprising:
a central processing unit (CPU) configured to:
control a display screen to display an operation image;
associate the operation image, displayed in a display region of the display screen, with an operating device, wherein
the operating device is on the display region,
the operation image is associated with the operating device based on presence of the operating device above a surface of a display device configured to display the display screen,
the operation image displays a value of a parameter related to a function of the operation image, and
the operating device is external to the information processing device and the display device;
control a projecting unit, to project a first display at a position related with the operating device, based on the association of the operation image with the operating device, wherein
the first display indicates a correspondence relation between the operation image and the operating device, and
the first display includes the value of the parameter displayed in the operation image;
adjust the value of the parameter in the operation image based on a user operation on the operating device; and
change the value of the parameter in the first display to the adjusted value of the parameter in the operation image.

2. The information processing device according to claim 1, wherein each time the value of the parameter in the operation image is adjusted, the CPU is further configured to control a form of the first display based on the adjusted value of the parameter in the operation image.

3. The information processing device according to claim 1, wherein
the first display includes a part of the operation image associated with the operating device, and
the part of the operation image is different from the value of the parameter of the operation image.

4. The information processing device according to claim 1, wherein
the CPU is further configured to control the display screen to display a second display at a position related to the operation image, and
the second display indicates the correspondence relation between the operation image and the operating device.

5. The information processing device according to claim 1, wherein the position related to the operating device is on a surface of the operating device.

6. The information processing device according to claim 5, wherein
a marker is installed on the surface of the operating device, and
recognition of content of the user operation is based on a result of motion detection of the marker.

7. The information processing device according to claim 6, wherein the CPU is further configured to:
control detection of the marker from the operating device; and
control transmission of a notification indicating a warning in case the user operation on the operating device is detected and the marker is not detected.

8. The information processing device according to claim 1, wherein the position related to the operating device is a position within a proximity of the operating device.

9. The information processing device according to claim 1, wherein the CPU is further configured to associate the operation image with the operating device, based on the user operation on the operating device and a user selection of the operation image displayed on the display screen.

10. The information processing device according to claim 9, wherein the CPU is further configured to:
control the display screen to display a plurality of operation images including the operation image; and associate the operation image of the plurality of operation images with the operating device based on the user selection of the operation image from the plurality of operation images.

11. The information processing device according to claim 1, wherein the CPU is further configured to control the projecting unit to project a specific image, displayed in the display region, onto the operating device.

12. The information processing device according to claim 1, wherein
the operating device includes a plurality of operating units, and
the plurality of operating units has a similar shape.

13. The information processing device according to claim 1, wherein the operation image is an image for adjustment of the function of the operation image.

14. The information processing device according to claim 1, wherein the CPU is further configured to control a storage unit to store correspondence information in association with the display screen.

15. An information processing method, comprising:
in an information processing device:
controlling a display screen to display an operation image;
associating the operation image, displayed in a display region of the display screen, with an operating device, wherein
the operating device is on the display region,
the operation image is associated with the operating device based on presence of the operating device above a surface of a display device configured to display the display screen,
the operation image displays a value of a parameter related to a function of the operation image, and
the operating device is external to the information processing device and the display device;
controlling a projecting unit, to project a first display at a position related with the operating device, based on the association of the operation image with the operating device, wherein
the first display indicates a correspondence relation between the operation image and the operating device, and
the first display includes the value of the parameter displayed in the operation image;
adjusting the value of the parameter in the operation image based on a user operation on the operating device; and
changing the value of the parameter in the first display to the adjusted value of the parameter in the operation image.

16. A non-transitory computer-readable medium having stored thereon computer-executable instructions, which when executed by a processor of an information processing apparatus, cause the processor to execute operations, the operations comprising:
controlling a display screen to display an operation image;
associating the operation image, displayed in a display region of the display screen, with an operating device, wherein
the operating device is on the display region,
the operation image is associated with the operating device based on presence of the operating device above a surface of a display device configured to display the display screen,
the operation image displays a value of a parameter related to a function of the operation image, and
the operating device is external to the information processing apparatus and the display device;
controlling a projecting unit, to project a first display at a position related with the operating device, based on the association of the operation image with the operating device, wherein
the first display indicates a correspondence relation between the operation image and the operating device, and
the first display includes the value of the parameter displayed in the operation image;
adjusting the value of the parameter in the operation image based on a user operation on the operating device; and
change the value of the parameter in the first display to the adjusted value of the parameter in the operation image.

* * * * *